US005871670A

United States Patent [19]

Hilti et al.

[11] Patent Number: 5,871,670

[45] Date of Patent: Feb. 16, 1999

[54] ELECTROCONDUCTIVE COMPOSITION

[75] Inventors: Bruno Hilti, Basel; Ernst Minder, Sissach; Jürgen Pfeiffer, Reinach, all of Switzerland

[73] Assignee: Ciba Specialty Chemicals Corporation, Tarrytown, N.Y.

[21] Appl. No.: 793,716

[22] PCT Filed: Sep. 8, 1995

[86] PCT No.: PCT/EP95/03537

§ 371 Date: Mar. 3, 1997

§ 102(e) Date: Mar. 3, 1997

[87] PCT Pub. No.: WO96/09629

PCT Pub. Date: Mar. 28, 1996

[30] Foreign Application Priority Data

Sep. 21, 1994 [GB] United Kingdom .................... 9418955

[51] Int. Cl.$^6$ ................................ H01B 1/20; C08K 5/00

[52] U.S. Cl. ............................ 252/500; 524/81; 524/910; 524/911

[58] Field of Search ............................ 252/500; 264/486, 264/494; 524/81, 82, 86, 910, 911

[56] References Cited

U.S. PATENT DOCUMENTS

| | | | |
|---|---|---|---|
| 4,769,177 | 9/1988 | Hocker et al. | 252/500 |
| 5,492,652 | 2/1996 | Chetcuti | 252/500 |
| 5,545,703 | 8/1996 | Castellucci | 526/256 |

FOREIGN PATENT DOCUMENTS

| | | |
|---|---|---|
| 285564 | 3/1988 | European Pat. Off. . |
| 523003 | 6/1992 | European Pat. Off. . |

OTHER PUBLICATIONS

Jeszka et al "A New Method of Growing Crystalline Networks . . . ", Polymers for Advanced Technologies, vol. 3, pp. 139–142, 1992 (no month).

*Primary Examiner*—Mark Kopec
*Attorney, Agent, or Firm*—Luther A. R. Hall; Jacob M. Levine

[57] ABSTRACT

A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that:

(1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass.

48 Claims, 2 Drawing Sheets

ELECTROCONDUCTIVE COMPOSITION

Figure 1:
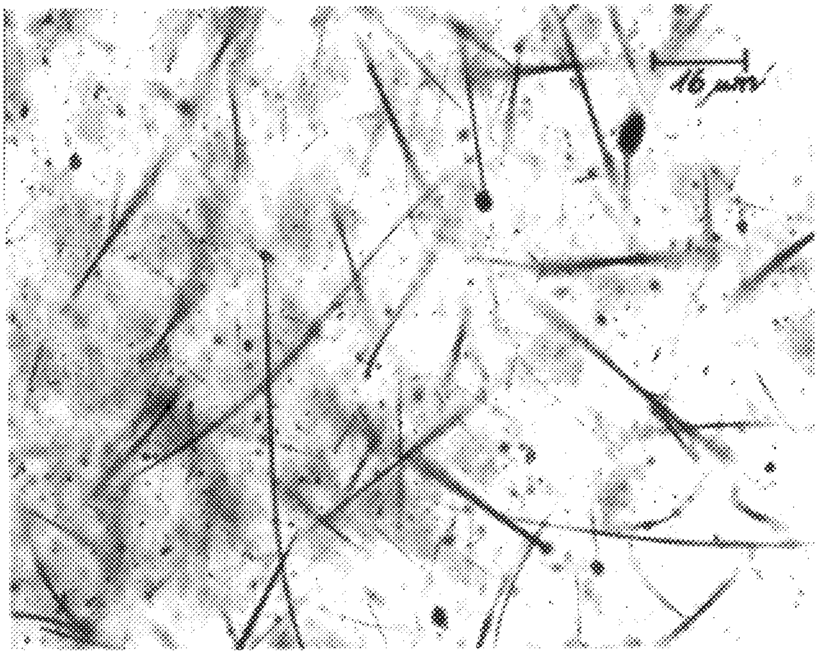

The present invention relates to an electroconductive composition comprising a polymer matrix and an electroconductive network, formed in the matrix, of charge transfer (CT) complex from an electron donor and an electron acceptor, a method of producing said composition and the use thereof.

EP-A-0 285 564 describes substrates with electroconductive polymer layers, which layers contain in the polymer matrix a network of radical cation salts from tetrathio-, tetraseleno- or tetratellurotetracene and metal salts or halogens. EP-A-0 362 141 discloses substrates which are directly coated with networks of such radical cation salts. EP-A-0 362 142 describes substrates in which these networks are embedded in halogen containing polymers. EP-A-0 362 143 describes substrates in which these networks are embedded in halogen containing and photosensitive polymers. One disadvantage of these polymer layers is, that organic solutions must be used for their preparation. Another disadvantage of these layers is that the electroconducting network is formed from CT complexes having needle-like crystals, which are relatively long and big, so that the amount of CT complexes can not be lowered too much without losing electroconductivity.

It has now been found, surprisingly, that an electroconductive percolated network system of a CT complex is formed in a polymer matrix by a solvent-free in situ process using an electron donor and an electron acceptor, either the electron donor or the electron acceptor particles being weakly soluble in the polymer matrix. Surprisingly the weakly polymer-soluble particles act as nucleating agents and a microcrystalline polymer-penetrating network is formed. The polymer compositions show antistatic properties or electroconductivity. It was further found that the size of the crystal-needles and thus the electroconductivity or antistatic properties can be influenced by the size of the weakly-polymer-soluble electron donor or acceptor.

One object of the instant invention is a composition comprising a matrix of a thermoplastic, thermosetting or a structurally crosslinked polymer, in which is incorporated an electroconductive network of crystal needles of a charge transfer complex (abbreviated CT complex) of an electron donor and an electron acceptor, characterized in that (1) the matrix contains uniformly distributed an excess, with respect to the CT complex formation, either of at least one electron donor or at least one electron acceptor as weakly polymer-soluble finely devided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) the crystal needles growing from the weakly polymer-soluble particles are formed in the polymer mass as microcrystalline needles, which are in contact and connect the weakly polymer-soluble particles, thus forming a network which penetrates the polymer mass.

Within the scope of the present invention the term "weakly polymer-soluble" means that seed particles are being dissolved slowly so that crystal growth is maintained only at the seed surface.

Preferably, the diameter of these particles is from 10 nm to 20 $\mu$m, more preferably 20 nm to 20 $\mu$m, and most preferably 50 nm to 5 $\mu$m.

The crystals of CT complex are contained in the polymer matrix in an amount of preferably $10^{-3}$ to 2% by weight, more preferably $10^{-2}$ to 1% by weight based on the polymer.

If $S_{CT}$ denotes the solubility of the CT complex in the polymer (in Mol/Kg) and if it is assumed that the molecular weight of the weakly polymer-soluble donor or acceptor is about one half of the molecular weight of the corresponding CT complex, the loading of the polymer with the weakly polymer-soluble donor or acceptor, $X^P_D$ or $X^P_A$ (in Mol/Kg), should be:

$$X^P_D \text{ or } X^P_A \geqq 2 \times S_{CT} \times 100 \text{ [Mol/Kg]}.$$

The factor of 100 ensures complete crystallization of the CT complex.

The above crystals have a length of preferably 0.1 $\mu$m to 1000 $\mu$m, more preferably 1 $\mu$m to 500 $\mu$m, and most preferably 10 $\mu$m to 400 $\mu$m, and an aspect ratio (length:width ratio) of preferably 1 to 10000, more preferably 10 to 5000 and most preferably 10 to 1000.

In the present invention, the network system incorporated in the polymer matrix comprises (a) particles of a weakly polymer-soluble electron donor and CT-crystals grown from said particles, or comprises (b) particles of a weakly polymer-soluble electron acceptor and CT-crystals grown from said particles. These particles act, therefore, as nuclei for the growth of the crystals as well as connecting points for the electroconductive network system.

The solubility of a particular electron donor or acceptor is dependent on the polymer, so that the same electron donor and/or acceptor can be soluble in a particular polymer while they are weakly polymer-soluble in other polymers. Accordingly, it is necessary that a polymer for the matrix is chosen such that the above requirement (a) or (b) is satisfied. The solubility can easily be determined by simple tests, such as by microscopic observation.

Illustrative examples of electron donors which can be weakly polymer-soluble as well as polymer-soluble are the following compounds (see for example EP-A-0 285 564 and EP-A-0 023 988).

1. Compounds of formula I or Ia or mixtures thereof

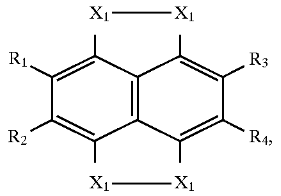

(I)

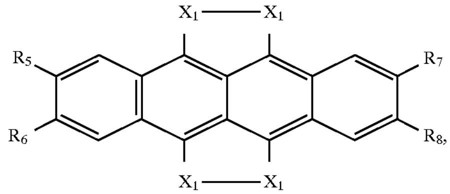

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

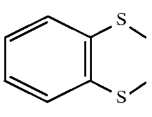

or

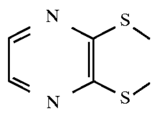

or $R_1$, $R_2$, $R_3$ and $R_4$ are each independent of one another phenylthio, 4-methyl- or 4-methoxyphenylthio or 4-pyridylthio, $R_5$, $R_6$, $R_7$ and $R_8$ are each independently of one another H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ are H or the residue of a primary amine which is diminished by $NH_2$— group.

In formulae I and Ia, $X_1$ is preferably S or Se. $R_9$ as halogen is especially Cl.

M in the residue —OM can be a metallic or ammonium cation. As metallic cations those of alkali metals and alkaline earth metals, such as $Li^{\oplus}$, $Na^{\oplus}$, $K^{\oplus}$, $Mg^{2\oplus}$, $Ca^{2\oplus}$, $Sr^{2\oplus}$ and $Ba^{2\oplus}$ are preferred. Further, $Zn^{2\oplus}$ and $Cd^{2\oplus}$ are also suitable. As ammonium cations, $NH^{4\oplus}$ and primary, secondary, tertiary or quaternary amines, which may contain preferably $C_1$–$C_{12}$alkyl, cyclohexyl, cyclopentyl, phenyl or benzyl groups, are preferred. The ammonium cations may be derived from 5- or 6-membered heterocyclic amines, such as piperidine, pyrrole and morpholine.

$R_9$ as a residue of an alcohol is preferably $C_1$–$C_6$-alkoxy or $C_2$–$C_6$-hydroxyalkoxy, benzyloxy, phenoxy, cyclopentyloxy or cyclohexyloxy.

$R_9$ as a residue of a primary or secondary amine is derived preferably from alkylamines with one or two $C_1$–$C_6$-alkyl groups. $R_{10}$ is preferably H, $C_1$–$C_{18}$-alkyl, phenyl or benzyl.

$R_{10}$ as alkyl contains preferably 1 to 12, especially 1 to 6, carbon atoms. Examples of the alkyl, which may be linear or branched, are methyl, ethyl, n- or i-propyl, n-, i- or t-butyl, pentyl, hexyl, 2-ethylhexyl, heptyl, octyl, nonyl, decyl, undecyl and dodecyl. Examples of the alkoxy and hydroxyalkoxy are methoxy, ethoxy, propoxy, butoxy, pentoxy, hexoxy, β-hydroxyethoxy, γ-hydroxypropoxy, δ-hydroxybutoxy and ω-hydroxyhexyloxy.

Especially preferred compounds represented by formulae I and Ia are 5,6,11,12-tetrathiotetracene, 5,6,11,12-tetraselenotetracene, 2-fluoro- or 2,3-difluoro-5,6,11,12-tetraselenotetracene, 2,3,8,9-tetramethyl-5,6,11,12-tetrathiotetracene, 2,3,8,9-tetramethyl-5,6,11,12-tetraselenotetracene, 2-methyl-5,6,11,12-tetrathiotetracene, 2,3,8,9-tetrafluoro-5,6,11,12-tetrathiotetracene, 2,3,8,9-tetrafluoro-5,6,11,12-tetraselenotetracene, 2,3-dichloro-5,6,11,12-tetraselenotetracene, 2-fluoro-5,6,11,12-tetratellurotetracene, 2,3,6,7-tetrathiophenyl-1,4,5,8-tetrathionaphthalene, 2,3,6,7-tetramethoxyphenyl-1,4,5,8-tetrathionaphthalene, 2,3,6,7-tetra-4-pyridylthio-1,4,5,8-tetrathionaphthalene, 2,3,6,7-tetraphenylthio-1,4,5,8-tetraselenonaphthalene, and the compounds

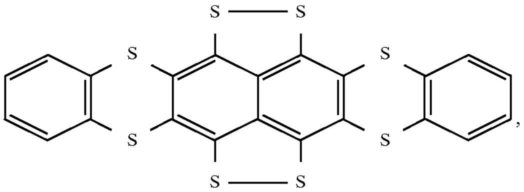

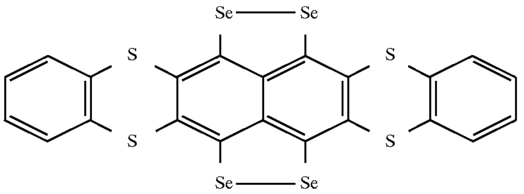

and

-continued

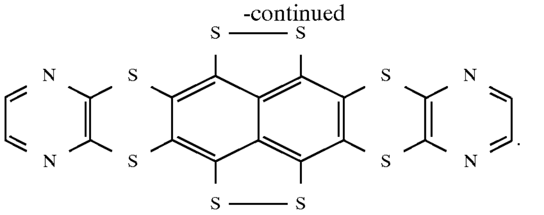

2. Compounds represented by formula II

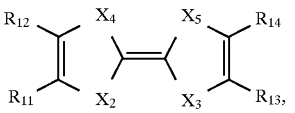

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or especially H, or $R_{11}$, and $R_{12}$ together sare a residue of

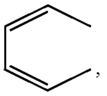

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or especially H, or $R_{11}$, and $R_{12}$ are each independently of the other $C_1$–$C_{12}$-alkyl, phenyl, $C_1$–$C_{12}$-alkylphenyl, $C_1$–$C_{12}$-alkoxyphenyl or especially H and $R_{13}$ and $R_{14}$ together are a residue of

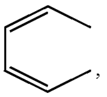

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ stand for Se or especially S.

3. Diheterodipyranes and their derivatives of formula III

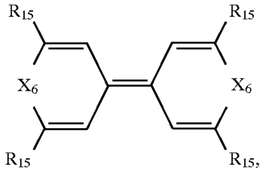

(III)

wherein $X_6$ is for S, Se or N—$C_1$–$C_{12}$-alkyl and $R_{15}$ is H, $C_1$–$C_{12}$-alkyl or substituted or unsubstituted phenyl. $X_6$ is preferably S, Se or N—$C_1$–$C_{12}$-alkyl, and $R_{15}$ is preferably H, $C_1$–$C_6$-alkyl or phenyl.

The above compounds of 1–3 are well known in the art. The compounds of 1 represented by general formulae I and Ia are described in detail for example in EP-A-0 285 564. The compounds of 2 and 3 represented by general formulae II and III are described for example in EP-A-0 023 988. The compounds 1–3 can be used alone or a mixture of at least two of them.

Examples of electron acceptors which can be polymer-soluble as well as weakly polymer-soluble are the following compounds (see for example EP-A-0 285 564, EP-A-0 362 142, EP-A-0 523 003 and DE-36 19 606).

1. Halogen containing organic compounds which cleave halogen (by applying energy, if necessary) and form CT complexes with electron donors. The energy can be for example thermal energy or radiation energy. If the energy is radiation energy, irradiation can be carried out non-imagewise or imagewise using a mask or by means of imagewise control of the radiation. Thermal energy means for example a temperature of from room temperature to 350° C., especially from 50° C. to 200° C. The halogen-containing organic compounds contain preferably Cl-, Br- or I-residues, and are halogenated, saturated or unsaturated, aliphatic, cycloaliphatic, aliphatic-heterocyclic, aromatic or heteroaromatic organic compounds which may be substituted by —CN, HO—, =O, $C_1$–$C_4$-alkyl, $C_1$–$C_4$-alkoxy, —CO—$C_1$–$C_4$-alkyl or —COO$C_1$–$C_4$-alkyl. The halogen compounds may be used singly or as a mixture. The organic compounds are preferably chlorinated and/or brominated. The compounds may be monohalogenated as for example N-brominated or N-chlorinated dicarboxylic acid imides. C-halogenated compounds preferably have a higher degree of halogenation; preferably, they are at least 80% C-halogenated, especially C-brominated and/or C-chlorinated. Compounds whose halogen atoms are activated by electron attracting groups are particularly suitable.

Examples of halogenated organic compounds are tetrabromomethane, bromoform, trichlorobromomethane, hexachloropropane, hexachlorocyclopropane, hexachlorocyclopropene, hexachlorocyclopentadiene, hexachloroethane, N-chlorosuccinimide, octachloropropane, n-octachlorobutane, n-decachlorobutane, tetrabromoethane, hexabromoethane, tetrabromobenzoquinone, 2,4,4,6-tetrabromo-2,5-cyclohexadienone, hexabromobenzene, chloranil, hexachloroacetone, 1,4,5,6,7,7-hexachloro-5-norbornen-2, 3-dicarboxylic acid, 1,2,5,6,9,10-hexabromocyclododecane, tetrachloroethylene, perchlorocyclopentadiene, perchlorobutadiene, dichloroacetaldehyde-diethylacetal, 1,4-dichloro-2-butene, 1,3-dichloro-2-butene, 3,4-dichloro-1-butene, tetrachlorocyclopropane, 1,3-dichloroacetone, 2,3,5,6-hexachloro-p-xylene, 1,4-bis(trichloromethyl)-benzene, 1,3-dibromopropane, 1,6-dibromohexane, 3-chloropropionic acid ethyl ester, 3-chlorotoluene, 2-chloropropionic acid methyl ester, 2-chloroacrylonitrile, trichloroacetic acid ethyl ester, 1,2,3-trichloropropane, 1,1, 2-trichloroethane, chloroformic acid butyl ester, trichloroethylene, 2,3-dichloromaleic anhydride, 1,12-dibromododecane, α,α'-dibromo-p-xylene, α,α'-dichloro-o-xylene, phenacyl chloride or bromide, 1,10-dibromododecane, α,α'-dichloro-p-xylene, α,α'-dibromo-m-xylene, iodoacetonitrile, 2,3-dichloro-5,6-dicyanobenzoquinone, 2,3-dichloropropionic acid methyl ester, 1-bromo-2-chloroethane, 1-bromo-2-chloropropane, chloroformic acid-2-bromoethyl ester, iodoacetic acid ethyl ester, N-chloro-, N-bromo- or N-iodosuccinimide or -phthalimide, or mixtures of these compounds.

These halogen containing compounds are described in detail for example in EP-A-0 285 564.

As other examples of the above halogen-containing organic compounds, there are also halogen containing polymers/monomers and prepolymers for thermosetting polymers and/or photopolymers. Preferred halogen-containing polymers are for example thermoplastic polymers containing aliphatic or cycloaliphatic side groups, which side groups are bound to the polymer backbone via a group —O—, —CO—, —CO—OA—OCO— or —CO—O— and contain at least one Cl-, Br- or I-atom in α-, β-, γ- or ω-position, wherein A is $C_2$–$C_{12}$-alkylene, $C_4$–$C_{12}$-cycloalkylene, $C_4$–$C_{12}$-cycloalkylene-$CH_2$—, $C_4$–$C_{12}$-cycloalkylene-$(CH_2)_2$—, benzylene or xylylene, which is unsubstituted or substituted by OH, Cl, Br or phenyl.

The aliphatic side groups are for example linear or branched $C_1$–$C_{12}$-, especially $C_1$–$C_6$-, particularly $C_1$–$C_4$-alkyl. Examples are methyl, ethyl and the isomers of propyl, butyl, pentyl, hexyl, heptyl, octyl, nonyl, decyl, undecyl and dodecyl. Examples of cycloaliphatic groups are especially cyclopentyl and cyclohexyl. Particularly preferred are methyl or ethyl which are substituted by Cl, Br or I, particularly Cl, for example —$CH_2Cl$, —$CHCl_2$, —$CCl_3$, —$CHClCH_3$, —$CCl_2CH_3$, —CHCl—$CH_2Cl$, —$CCl_2$—$CH_2Cl$, —CHCl—$CHCl_2$, —$CCl_2$—$CHCl_2$, —$CCl_2$—$CCl_3$, —$CH_2$—$CH_2Cl$, —$CH_2$—$CHCl_2$ or —$CH_2$—$CCl_3$.

The groups —O, —O—CO—, —CO—, —OA—O—CO— or —CO—O— preferably have groups of the formula —$C_mH_nY_o$ bonded to them, wherein m is a number from 1 to 12, n is 0 or a number from 1 to 24, o is a number from 1 to 25 and n+o=2 m+1, Y is Cl, Br or I and A is $C_2$–$C_{12}$-alkylene, $C_4$–$C_{12}$-cycloalkylene, $C_4$–$C_{12}$-cycloalkylene-$CH_2$—, $C_2$–$C_{12}$-cycloalkylene-$(CH_2)_2$—, benzylene or xylylene which is unsubstituted or substituted by OH, Cl, Br or phenyl, Y is preferably Cl, m is preferably 1 to 6, especially 1 to 4, n is preferably 0 or 1 to 12, especially 1 to 8, o is preferably 1 to 13, especially 1 to 9, and n+o=2 m+1.

The thermoplastic polymers can be based on different polymers containing hydroxy groups or caboxyl groups, or mixtures of said polymers, e.g. polyesters, polyester-amides, polyurethanes, polyamides, polycarbonates and polyimides derived from monomers containing hydroxy groups, saponified and unsubstituted or hydroxyalkylated polymers of vinyl esters or ethers, hydroxylated polydiolefins such as polybutadiene or polyisoprene, polyacrylates or polymethacrylates containing hydroxyalkyl radicals in the ester group, polyacrylic or polymethacrylic acids, or reduced polyketones or copolymers thereof, as well as copolymers of unsubstituted or hydroxyalkyleted vinyl alcohol, acrylates or methacrylates, acrylic acids or methacrylic acids or diolefins with comonomers such as acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters, and polyadducts of unsubstituted or hydroxyalkylated epoxy compounds containing an average of more than one epoxy group per molecule, and diols, primary monoamines, di-secondary diamines, di-secondary linear or cyclic dicarboxylic acid diamides or dicarboxylic acids.

In a preferred embodiment, the thermoplastic polymer is a linear polyadduct of a glycidyl compound containing an average of more than one epoxy group, and a diol, a primary monoamine, a di-secondary diamine, a di-secondary linear or cyclic dicarboxylic acid diamide or a dicarboxylic acid, in which polyadduct the H atom of the secondary OH groups is at least partially substituted by a group —CO—$C_mH_nY_o$, wherein m is a number from 1 to 12, n is 0 or a number from 1 to 24, o is a number from 1 to 25 and n+o=2 m+1, and Y is Cl, Br or I.

The polyadducts are preferably based on glycidyl compounds containing an average of two epoxy groups per molecule.

Especially suitable glycidyl compounds are those containing two glycidyl groups, β-methylglycidyl groups or 2,3-epoxycyclopentyl groups bonded to a hetero atom (for example, sulfur or, preferably, oxygen or nitrogen), especially bis(2,3-epoxycyclopentyl)ether; diglycidyl ethers of polyhydric aliphatic alcohols such as 1,4-butanediol, or polyalkylene glycols such as polypropylene glycol; diglycidyl ethers of cycloaliphatic polyols such as 2,2-bis(4-hydroxycyclohexyl)propane; diglycidyl ethers of polyhydric phenols such as resorcinol, bis(p-hydroxyphenyl)methane, 2,2-bis(p-hydroxyphenyl)propane(=diomethane), 2,2-bis (4'-hydroxy-3,5'-dibromophenyl)propane and 1,3-bis(p-hydroxyphenyl)ethane; di(β-methylolycidyl)ethers of the dihydric alcohols or dihydric phenols listed above; diglycidyl esters of dicarboxylic acids such as phthalic acid, terephthalic acid, $\Delta^4$-tetrahydrophthalic acid and hexahydrophthalic acid; N,N-diglycidyl derivatives of primary amines and amides and heterocyclic nitrogen bases containing two nitrogen atoms, and N,N'-diglycidyl derivatives of di-secondary diamides and diamines, such as N,N-diglycidylaniline, N,N-diglycidyltoluidine, N,N-diglycidyl-p-aminophenyl methyl ether and N,N'-dimethyl-N,N'-diglycidyl-bis(p-aminophenyl)methane; N',N"-diglycidyl-N-phenyl isocyanurate; N,N'-diglycidylethyleneurea; N,N'-diglycidyl-5,5-dimethylhydantoin, N,N'-diglycidyl-5-isopropylhydantoin, N,N-methylene-bis(N',N-diglycidyl-5,5-dimethylhydantoin) and 1,3-bis(N-glycidyl-5,5-dimethylhydantoin)-2-hydroxypropane; and N,N'-diglycidyl-5,5-dimethyl-6-isopropyl-5,6-dihydrouracil.

The glycidyl compounds can be reacted with aliphatic, cycloaliphatic or aromatic diols to give the preferred polyadducts, a secondary alcohol group, which can be esterified with carboxylic acids containing Cl, Br and/or I, being formed by addition to the glycidyl group.

However, the glycidyl compounds can also be reacted with the following compounds to give linear polyadducts by polyaddition: primary aliphatic, cycloaliphatic or aromatic monoamines (e.g. aniline, toluidine, $C_1$–$C_{12}$-alkylamines, $C_2$–$C_{12}$-hydroxyalkylamines), aliphatic, cycloaliphatic or aromatic dicarboxylic acids (e.g. maleic acid, adipic acid, trimethyladipic acid, sebacic acid, azelaic acid, succinic acid, dodecylsuccinic acid, phthalic acid, terephthalic acid, $\Delta^4$-tetrahydrophthalic acid, hexahydrophthalic acid, $\Delta^4$-methylhexahydrophthalic acid, 3,6-endomethylene-$\Delta^4$-tetrahydrophthalic acid, 4-methyl-3,6-endomethylene-$\Delta^4$-tetrahydrophthalic acid) or aliphatic, cycloaliphatic, heterocyclic or aromatic bis-secondary amines or bis-secondary carboxyamides (e.g. N,N'-dimethylethylenediamine, N,N'-dimethylpropylene-1,3-diamine, N,N'-dimethylhexamethylenediamine, N,N'-dicyclohexylhexamethylenediamine, N,N',N"-trimethyldiethylenetriamine, N,N'-diethylpropylene-1,3-diamine, N-methyl-3,5,5-trimethyl-3-(methylaminomethyl) cyclohexylamine, N,N'-dimethylated or N,N'-diethylated aromatic diamines, e.g. m- or p-phenylenediamine, bis(4-aminophenyl)methane or bis(4-aminophenyl)sulfone, 2,2-bis-(4-aminophenyl)propane, N,N-dimethyl-m-xylylenediamine, as well as ethyleneurea, 5,5-dimethylhydantoin, 5-isopropylhydantoin, N,N-methylene-bis-5,5-dimethylhydantoin, 1,3-bis(5,5-dimethylhydantoin)-2-hydroxypropane, 5,5-dimethyl-6-isopropyl-5,6-dihydrouracil).

In a preferred embodiment, the polyadduct contains a) 100 to 0.1 mol % of identical or different structural units of formula IV

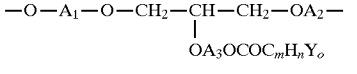

(IV)

and b) 99.9 to 0 mol % of identical or different structural units of formula V

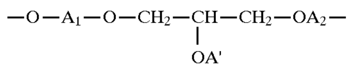

(V)

based on the polyadduct, wherein $A_1$ and $A_2$ are each independently of the other the radical of a diol containing aliphatic or aromatic diol groups, from which two hydroxyl groups have been removed, A' is H, unsubstituted or OH-substituted $C_1$–$C_{20}$-alkyl, $C_1$–$C_{20}$-acyl or aminocarbonyl N-substituted by a $C_1$–$C_{20}$-hydrocarbon radical, —$OA_3$— is a direct bond or $A_3$ is ethylene which is unsubstituted or substituted by $C_1$–$C_{16}$-alkyl.

The polyadduct preferably contains 100 to 20 and especially 30 to 100 mol % of structural units of formula IV and 80 to 0 especially 70 to 0 mol % of structural units of formula V.

In a preferred embodiment, $A_1$ and $A_2$ are identical radicals. $A_1$ and $A_2$ as radical having aliphatic diol groups preferably contain 2 to 12 and especially 2 to 8 C atoms. The hydroxy groups can be bonded to open-chain or cyclic aliphatic radicals. Examples of typical aliphatic radicals are linear or branched $C_2$–$C_{12}$-alkylene, $C_3$–$C_8$-cycloalkylene, $C_1$–$C_4$-alkyl-$C_5$–$C_8$-cycloalkyl, cyclohexylmethylene or cyclohexyldimethylene. Examples are ethylene, 1,2- or 1,3-propylene, 1,2-, 1,3- or 1,4-butylene, 1,2-, 1,3-, 1,4- or 1,5-pentylene, 1,2-, 1,3-, 1,4-, 1,5- or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are especially phenolic groups. The diol radicals having phenolic groups preferably contain 6–30 and especially 6–20 C atoms. A preferred embodiment consists of polyadducts in which $A_1$ and $A_2$ are independently of the other a radical of the formula

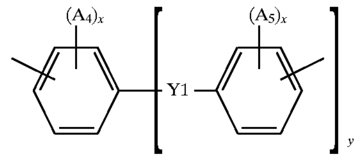

wherein $Y_1$ is a direct bond, $C_1$–$C_4$-alkylene, $C_2$–$C_{12}$-alkylidene, $C_5$–$C_8$-cycloalkylidene, —O—, —S—, —SO—, —$SO_2$—, —CO—, —$CO_2$—, —N($C_1$–$C_4$-alkyl)- or —$Si(CH_3)_2$—, $A_4$ and $A_5$ are independently of the other H, halogen, $C_1$–$C_4$-alkyl or $C_1$–$C_4$-alkoxy, x is 0, 1 or 2 and y is 0 or 1.

$Y_1$ is preferably a direct bond, methylene, ethylene, $C_2$–$C_6$-alkylidene, cyclohexylidene, cyclopentylidene, —O— or —S—. $A_4$ and $A_5$ are preferably H or methyl and y is preferably 1.

$A_1$ and $A_2$ are especially the radical

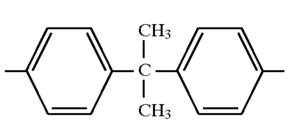

$A_3$ as alkyl-substituted ethylene preferably contains $C_1$–$C_4$-alkyl and especially $C_1$ or $C_2$ alkyl. Ethylene, 1,2-propylene and 1,2- or 2,3-butylene are especially preferred.

A' as $C_1$–$C_{20}$-alkyl can be linear or branched. A' as acyl can be e.g. $C_1$–$C_{20}$-alkyl-CO—, $C_5$–$C_8$-cycloalkyl-CO—, $C_1$–$C_{15}$-alkyl-$C_5$–$C_8$-cycloalkyl-CO—, $C_5$–$C_8$-cycloalkyl-$CH_2$—CO—, $C_1$–$C_{14}$-alkyl-$C_5$–$C_8$-cycloalkyl-$CH_2$—CO—, phenyl-CO—, benzyl-CO—, $C_1$–$C_{14}$-alkyl-phenyl-CO— or $C_1$–$C_4$-alkyl-benzyl-CO—. The hydrocarbon radical in the aminocarbonyl can be e.g. $C_1$–$C_{20}$-alkyl-, $C_5$–$C_8$-cycloalkyl-, $C_1$–$C_{15}$-alkyl-$C_5$–$C_8$-cycloalkyl, $C_5$–$C_8$-cycloalkyl-$CH_2$—, $C_1$–$C_4$-alkyl-$C_5$–$C_8$-cycloalkyl-$CH_2$—, phenyl-, benzyl-, $C_1$–$C_{14}$-alkyl-phenyl- or $C_1$–$C_{14}$-alkyl-benzyl-. A' is preferably H.

In another preferred embodiment, the thermoplastic polymer is a homopolymer or a copolymer of an acrylic acid ester or methacrylic acid ester containing chlorinated, brominated and/or iodinated aliphatic or cycloaliphatic groups in the ester group.

In an especially preferred embodiment, the polymer contains a) 0.1 to 100 mol % of at least one structural unit of formula VI

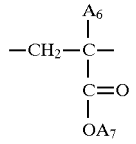

(VI)

and b) 0 to 99.9 mol % of at least one structural unit of formula VII

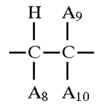

(VII)

based on the polymer, wherein $A_6$ is H or methyl; $A_7$ is a radical —(A—O—CO)$_z$—$C_mH_nY_o$, wherein z is 0 or 1, m is a number from 1 to 12, n is 0 or a number from 1 to 24, o is a number from 1 to 25 and n+o=2 m+1, Y is Cl, Br or I and A is $C_2$–$C_{12}$-alkylene, $C_4$–$C_{12}$-cycloalkylene, $C_4$–$C_{12}$-cycloalkylene-$CH_2$—, $C_2$–$C_{12}$-cycloalkylene-$(CH_2)_2$—, benzylene or xylylene which is unsubstituted or substituted by OH, Cl, Br or phenyl; $A_8$ is H, $C_1$–$C_6$-alkyl or —$COOA_{11}$; $A_9$ is H, F, Cl, CN or $C_1$–$C_6$-alkyl; and $A_{10}$ is H, F, Cl, CN, $A_{11}$—O—, $C_1$–$C_{12}$-alkyl, —$COOA_{11}$, —O—CO—$A_{11}$, —COOA—OH,

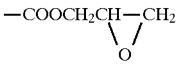

or phenyl, wherein A is as defined above and $A_{11}$ is $C_1$–$C_{18}$-alkyl, $C_5$–$C_7$-cycloalkyl, ($C_1$–$C_{12}$-alkyl)-$C_5$–$C_7$-cycloalkyl, phenyl, ($C_1$–$C_{12}$-alkyl)phenyl, benzyl or ($C_1$–$C_{12}$-alkyl) benzyl.

The polymer preferably contains 100 to 20 and especially 100 to 30 mol % of structural units of formula VI and 80 to 0 and especially 70 to 0 mol % of structural units of formula VII.

$A_6$ is preferably methyl, Y, m, n and o have the preferred meanings given above and z is preferably 1.

A is preferably unsubstituted or substituted by OH or Cl. A as alkylene preferably contains 2 to 6 C atoms. The alkylene can be linear or branched. Examples are ethylene and the isomers of propylene, butylene, pentylene, hexylene, heptylene, octylene, nonylene, decylene, undecylene and dodecylene. A as cycloalkylene is especially cyclohexylene and, in the radicals containing cycloalkylene, is preferably cyclohexylene.

$A_{11}$, can be linear or branched $C_1$–$C_{18}$-, preferably $C_1$–$C_{12}$- and especially $C_1$–$C_6$-alkyl. $A_{11}$ as cycloalkyl is especially cyclopentyl or cyclohexyl. When $A_{11}$ is ($C_1$–$C_{12}$-alkyl)cycloalkyl, the cycloalkyl is especially cyclopentyl or cyclohexyl and the alkyl group can be linear or branched and preferably contains 1 to 6 and especially 1 to 4 C atoms. When $A_{11}$ is alkylphenyl or alkylbenzyl, the alkyl group can be linear or branched and preferably contains 1 to 6 and especially 1 to 4 C atoms.

$A_8$ is preferably H. $A_8$ as alkyl is preferably methyl or ethyl. When $A_8$ is —$COOA_{11}$, $A_{11}$ is preferably $C_1$–$C_{12}$- and especially $C_1$–$C_6$-alkyl.

$A_9$ as alkyl is preferably $C_1$–$C_4$-alkyl, e.g. methyl, ethyl, n-propyl or n-butyl. $A_9$ is preferably H, Cl or $C_1$–$C_4$-alkyl.

When $A_{10}$ is the group $A_{11}$—O—, $A_{11}$ is preferably $C_1$–$C_{12}$- and especially $C_1$–$C_6$-alkyl. $A_{10}$ as alkyl preferably contains 1 to 6 and especially 1 to 4 C atoms. When $A_{10}$ is the group —$COOA_{11}$, $A_{11}$ is preferably $C_1$–$C_{12}$- and especially $C_1$–$C_6$-alkyl, cyclopentyl or cyclohexyl. When $A_{10}$ is the group —OCO—$A_{11}$, $A_{11}$, is preferably $C_1$–$C_{12}$- and especially $C_1$–$C_6$-alkyl, phenyl or benzyl.

When $A_{10}$ is the group —COOAOH, A has the preferred meanings given above.

In a preferred embodiment, $A_8$ is H, $A_9$ is H, F, Cl, methyl or ethyl and $A_{10}$ is F, Cl, CN, $C_1$–$C_4$-alkyl, $C_1$–$C_6$-alkoxy, —COO—$C_1$–$C_6$-alkyl, —COO—A—OH, —OOC—$C_1$–$C_6$-alkyl or phenyl.

In a preferred polyadduct, $A_6$, is methyl; $A_7$ is a radical —A—O—CO—$C_mH_nY_o$, wherein m is a number from 1 to 6, n is 0 or a number from 1 to 12, o is a number from 1 to 13 and n+o=2 m+1, Y is Cl and A is $C_2$–$C_6$-alkylene, cyclopentylene, cyclohexylene, cyclopentylene-$CH_2$—, cyclohexylene-$CH_2$— or cyclohexylene-$(CH_2)_2$— which is unsubstituted or substituted by OH or Cl; $A_8$ is H; $A_9$ is H, F, Cl or $C_1$–$C_4$-alkyl; and $A_{10}$ is H, F, Cl, CN, $A_{11}$—O—, $C_1$–$C_6$-alkyl, —$COOA_{11}$, —O—CO—$A_{11}$, —COOA—OH,

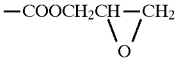

or phenyl, A being as defined above and $A_{11}$ being $C_1$–$C_6$-alkyl, $C_5$- or $C_6$-cycloalkyl, phenyl or benzyl.

In another preferred polyadduct, $A_6$ is methyl; $A_7$ is a radical —A—O—CO—$C_mH_nY_o$, wherein m is a number from 1 to 4, n is a 0 or a number from 1 to 8, o is a number from 1 to 13 and n+o=2 m+1, Y is Cl and A is a linear $C_2$–$C_6$-alkylene or —$CH_2CHOHCH_2$—; $A_8$ and $A_9$ are H; and $A_{10}$ is $C_1$–$C_6$-alkyl.

Especially preferred polyadducts are those in which, in formula VI, $A_6$ is H or $CH_3$ and A is linear or branched $C_2$–$C_6$-alkylene, cyclopentylene or cyclohexylene, and in formula VII, $A_8$ is H, $A_9$ is H or methyl and $A_{10}$ is —$COOA_{11}$ or —COOAOH, A and $A_{11}$ being defined above, including the preferred meanings.

In another preferred embodiment, the thermoplastic polymer is a homopolymer or copolymer of vinyl alcohol in which the H atom of the secondary OH group is at least partially substituted by a group —Z—$C_mH_nY_o$, wherein Z is a direct bond, —CO— or —$A_3$—O—CO—, Y is Cl, Br or I, m is a number from 1 to 12, n is 0 or a number from 1 to 24, o is a number from 1 to 25 and n+o=2 m+1, $A_3$ being ethylene which is unsubstituted or substituted by $C_1$–$C_6$-alkyl.

Preferred polyadducts are those containing a) 90 to 0.1 mol % of structural units of formula VIII

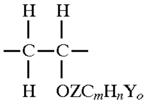

(VIII)

and b) 99.9 to 10 mol % of identical or different structural units of formula IX

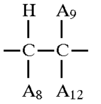

(IX)

wherein Z is a direct bond, —CO— or —$A_3$—O—CO—, $A_3$ being ethylene which is unsubstituted or substituted by $C_1$–$C_{16}$-alkyl; Y is Cl, Br or I; m is a number from 1 to 12, n is 0 or a number from 1 to 24, o is a number from 1 to 25 and n+o=2 m+1; $A_{12}$ is H, $C_1$–$C_6$-alkyl or —$COOA_{11}$; $A_9$ is H, F, Cl, CN or $C_1$–$C_6$-alkyl; and $A_{12}$ is H, F, Cl, CN, OH, $A_{11}$O—, $C_1$–$C_{12}$-alkyl, —$COOA_{11}$, —O—CO—$A_{11}$, —OAOH or phenyl, $A_{11}$ being $C_1$–$C_1C_{18}$-alkyl, $C_5$–$C_7$-cycloalkyl, ($C_1$–$C_{12}$-alkyl)-$C_5$–$C_7$-cycloalkyl, phenyl, ($C_1$–$C_{12}$-alkyl) phenyl, benzyl or ($C_1$–$C_{12}$-alkyl)benzyl and A being ethylene which is unsubstituted or substituted by $C_1$–$C_{16}$-alkyl.

The adduct preferably contains 70 to 10 and especially 60 to 20 mol % of structural units of formula VIII and 30 to 90 and especially 40 to 80 mol % of structural units of formula IX.

$A_8$ and $A_9$ in formula IX have the preferred meanings given above. A and $A_{11}$ also have the preferred meanings given above.

$A_{12}$ is preferably H, F, Cl, CN, OH, $A_{11}$, —O—, $C_1$–$C_4$-alkyl, —$COOA_{11}$, —O—CO—$A_{11}$, phenyl, —$OCH_2CH_2OH$ or —$OCH_2CH(CH_3)OH$, $A_{11}$ being $C_1$–$C_6$-alkyl.

Especially preferred polyadducts are those in which $A_8$ and $A_9$ are H and $A_{12}$ is —$OCOA_{11}$, wherein $A_{11}$ is $C_1$–$C_{18}$-alkyl, $C_5$–$C_7$-cycloalkyl, ($C_1$–$C_{12}$-alkyl)-$C_5$–$C_7$-cycloalkyl, phenyl, benzyl, ($C_1$–$C_{12}$-alkyl)phenyl or ($C_1$–$C_{12}$-alkyl)benzyl.

In a preferred embodiment, Z is a direct bond, —CO—, —$CH_2CH_2O$—CO— or —$CH_2CH(CH_3)O$—CO—; Y is Cl; m is a number from 1 to 6, n is 0 or a number from 1 to 12, o is a number from 1 to 13 and n+o=2 m+1; $A_8$ and $A_9$ are H; and $A_{12}$ is H, F, Cl, CN, OH, $A_{11}$O—, $C_1$–$C_4$-alkyl, —$COOA_{11}$, —O—CO—$A_{11}$, phenyl, —$OCH_2CH_2OH$ or —$OCH_2CH(CH_3)OH$, $A_{11}$, being $C_1$–$C_6$-alkyl, $C_5$- or $C_6$-cycloalkyl, phenyl or benzyl.

These halogen containing polymers are described in detail for example in EP-A-0 362 142. Preferred halogen containing monomers are those used for the preparation of the above halogen containing polymers, and preferred prepolymers are for example derived from these halogen containing monomers.

The halogen containing organic compound may also be the polymer matrix itself. Examples of such halogen containing matrix polymers are polychloroprene, chlorinated rubber, chlorinated or chlorosulfonated polyethylene, epichlorohydrin homopolymers and copolymers, especially polymers of halogen containing vinyl compounds, such as polyvinyl chloride, polyvinylidene chloride, polyvinyl fluoride or polyvinylidene fluoride, and copolymers thereof such as vinyl chloride/vinylidene chloride, vinyl chloride/vinyl acetate or vinylidene chloride/vinyl acetate.

2. Salts of oxidatively acting cations with non-nucleophilic anions. Examples of such anions are halogen ($F^{\ominus}$, $Cl^{\ominus}$), $BF_4^{\ominus}$, $SbF_6^{\ominus}$, $AsF_6^{\ominus}$ and $PF_6^{\ominus}$, and examples of the cations are those of transition metals or rare earth metals, such as Fe(III), Co(III) and Ce(IV), or non-metallic cations such as $NO^{\oplus}$. Examples of the salts are $NOBF_4$, $FeCl_3$ and $Co(PF_6)_3$. These compounds are described for example in EP-A-0 285 564.

3. $CuCl_2$ and $CuBr_2$, and their aquo-, solvent- or ammonium complexes. Solvent complexes of $CuCl_2$ and $CuBr_2$ with polar aprotic or polar protic solvents are well known in the art. Monomer, dimer as well as polymer complexes can be used. Preferable solvents which form complexes with $CuCl_2$ and $CuBr_2$, are those having heteroatoms such as for example oxygen, sulfur, phosphor and nitrogen. Examples of such solvents are ethers (diethyl ether, dibutyl ether, ethylene glycol dimethyl or diethyl ether), esters and lactones (ethyl acetate, γ-butyrolactone), sulfones (dimethyl sulfone, tetramethylene sulfone) and amines (pyridine, α-pyridone, α-methylpyridine, ethylenediamine, N,N'-dimethylethylenediamine, 1-(β-aminoethyl)pyridine). $CuCl_2$ and its aquo and solvent complexes are described for example in EP-A-0 523 003. Suitable ammonium complexes are for example tetramethylammonium-, tetraethylammonium-, tetrapropylammonium-, tatrabutylammonium-, tetrapentylammonium-, tetrahexylammonium-, tetraheptylammonium- and tetraoctylammonium-$CuCl_2$, and -$CuBr_2$. These complexes can readily be prepared in a manner known per se.

4. Tetracyanoethylene, tetracyanoquinodimethanes of formula X or N,N'-dicyanoquinodimethanes of formula XI, as well as mixtures of compounds represented by formula X and/or XI

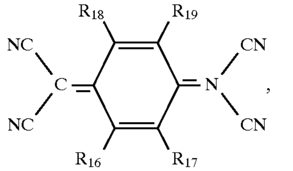

(X)

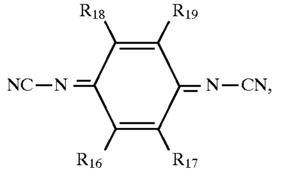

(XI)

wherein $R_{16}$, $R_{17}$, $R_{18}$ and $R_{19}$ are each independently of one another $C_1$–$C_{12}$-alkyl, $C_1$–$C_{12}$-alkoxy, $C_1$–$C_{12}$-alkylsulfido, phenyl, halogen, —CN or especially H, $R_{16}$ and $R_{17}$ are together a residue of

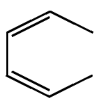

,

—$(CH_2)_m$—, —$(CH_2)_m$—O—$(CH_2)_m$— or —O—$(CH_2)_m$—O—, m is an integer 1–12 and $R_{18}$ and $R_{19}$ are each independently of the other $C_1$–$C_{12}$-alkyl, $C_1$–$C_{12}$-alkoxy, $C_1$–$C_{12}$-alkylsulfido, phenyl, halogen, —CN or especially H, or $R_{16}$ and $R_{17}$ are each independently of the other $C_1$–$C_{12}$-alkyl, $C_1$–$C_{12}$-alkoxy, $C_1$–$C_{12}$-alkylsulfido, phenyl, halogen, —CN or especially H and $R_{18}$ and $R_{19}$ are together a residue of

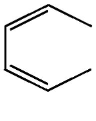

, $-(CH_2)_m-$, $-(CH_2)_m-O-(CH_2)_m-$ or $-O-(CH_2)_m-O-$, m is an integer 1–12, in which the condensed aromatic rings may be substituted by one or two chlorine or bromine atoms or $C_1$–$C_4$-alkoxy and/or $C_1$–$C_4$-alkyl groups.

5. Metal complexes of formula XII

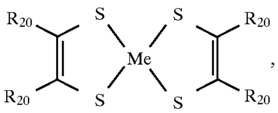

(XI) , wherein Me means Pt or Pd, and $R_{20}$ is $-CN$, $-CH_3$ or $-CF_3$.

The compounds represented by formula X, XI and XII are described for example in DE 36 19606.1

6. Quinones such as benzoquinone, naphthoquinone and anthraquinone, which may be unsubstituted or substituted by $C_1$–$C_{12}$-alkyl, $C_1$–$C_{12}$-alkoxy, $C_5$–$C_7$-cycloalkyl, halogen, benzyl, phenyl, naphthyl, $-CF_3$, $-CN$, or $-NO_2$, as well as mixtures among them. These quinones are well known in the art.

The above mentioned electron acceptors may be used alone or as a mixture of at least two of them.

The CT-crystal forming the electroconductive network of the instant invention is represented by general formula XIII $$(D)(A)_n \qquad (XIII),$$

wherein D is an electron donor, A is an electron acceptor and n is a number 0.1–2.0, preferably 0.3–0.9 and most preferably 0.3–0.8, and the electron donor is weakly polymer-soluble if the electron acceptor is polymer-soluble while the electron donor is polymer-soluble if the electron acceptor is weakly polymer-soluble.

Preferably, the electron donor D is a compound represented by formula I or Ia, especially 5,6,11,12-tetrathiotetracene, 5,6,11,12-tetraselenotetracene, 2-fluoro- or 2,3-difluoro-5,6,11,12-tetraselenotetracene, 2,3,8,9-tetramethyl-5,6,11,12-tetrathiotetracene, 2,3,8,9-tetramethyl-5,6,11,12-tetraselenotetracene, 2-methyl-5,6,11,12-tetrathiotetracene, 2,3,8,9-tetrafluoro-5,6,11,12-tetrathiotetracene, 2,3,8,9-tetrafluoro-5,6,11,12-tetraselenotetracene, 2,3-dichloro-5,6,11,12-tetraselenotetracene, 2-fluoro-5,6,11,12-tetratellurotetracene, 2,3,6,7-tetrathiophenyl-1,4,5,8-tetrathionaphthalene, 2,3,6,7-tetramethoxyphenyl-1,4,5,8-tetrathionaphthalene, 2,3,6,7-tetra-4-pyridylthio-1,4,5,8-tetrathionaphthalene, 2,3,6,7-tetraphenylthio-1,4,5,8-tetraselenonaphthalene, or the compound

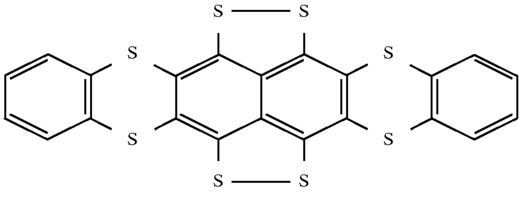

,

-continued

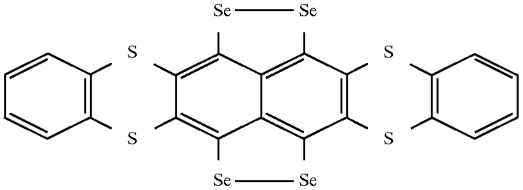

or

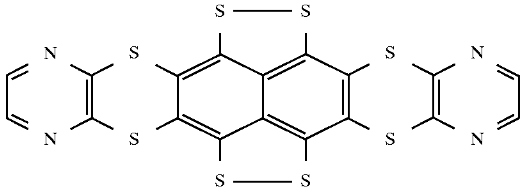

.

The most preferred electron donor is 5,6,11,12-tetrathiotetracene or 5,6,11,12-tetraselenotetracene.

Preferred electron acceptor A is one selected from the group consisting of the above described halogen containing organic compounds including halogen containing polymers, monomers and prepolymers and halogen containing matrix polymers, $CuCl_2$ and $CuBr_2$ and their aquo, solvent and ammonium complexes. Most preferred is anhydrous $CuCl_2$, anhydrous $CuBr_2$, an ammonium complex of $CuCl_2$ or an ammonium complex of $CuBr_2$.

Illustrative examples of themoplastic polymers suitable as matrix polymers are the following (see for example EP-A-0 523 003):

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbornene, polyethylene (which can be uncrosslinked or crosslinked), for example high density polyethylene (HDPE), low density polyethylene (LDPE), linear low density polyethylene (LLDPE), branched low density polyethylene (BLDPE).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, ethylene/hexene copolymers, ethylene/ethylpentene copolymers, ethylene/heptene copolymers, ethylene/octene copolymers, propylene/iso-butylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and the salts thereof (ionomers), as well as terpolymers of ethylene with propylene and a diene, such as hexadiene, dicyclopentadiene or ethylidene-norbornene; and also mixtures of such polymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

3a. Hydrocarbon resins (for example $C_5$–$C_9$) including hydrogenated modifications thereof (for example tackifiers) and mixtures of polyalkylenes and starch.

4. Polystyrene, poly(p-methylstyrene), poly((α-methylstyrene).

5. Copolymers of styrene or α-methylstyrene with dienes or acrylic derivatives, for example styrene/butadiene, styrene/acrylonitrile, styrene/alkyl methacrylate, styrene/maleic anhydride, styrene/butadiene/alkyl acrylate, styrene/butadiene/alkyl methacrylate styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/-styrene or styrene/ethylene/propylene/ styrene.

6. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed in 5), for example the copolymer mixtures known as ABS, MBS, ASA or AES polymers.

7. Halogen-containing polymers, such as polychloroprene, chlorinated rubbers, chlorinated or chlorosulfonated polyethylene, copolymers of ethylene and chlorinated ethylene, epichlorohydrin homo- and copolymers, polymers of halogenated vinyl compounds, for example polyvinyl chloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from α,β-unsaturated acids and derivatives thereof, such as polyacrylates and polymethacrylates, polymethyl methacrylate impact-modified with butyl acrylate, polyacrylamides and polyacrylonitrile.

9. Copolymers of the monomers mentioned in 8) with each other or with other unsaturated monomers, for example acrylonitrile/butadiene, acrylonitrile/alkyl acrylate, acrylonitrile/alkoxyalkyl acrylate or acrylonitrile/vinyl halide copolymers or acrylonitrile/alkyl methacrylate/butadiene terpolymers.

10. Polymers derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

11. Homopolymers and copolymers of cyclic ethers, such as polyalkylene glycols, polyethylene oxide, polypropylene oxide or copolymers thereof with bis(glycidyl) ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides and mixtures thereof with styrene polymers or polyamides.

14. Polyurethanes derived from polyethers, polyesters or hydroxyl-terminated polybutadienes on the one hand and aliphatic or aromatic polyisocyanates on the other, as well as precursors thereof.

15. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides obtained by condensation of m-xylene diamine and adipic acid; polyamides prepared from hexamethylenediamine and isophthalic or/and terephthalic acid and optionally an elastomer as modifier, for example poly-2,4,4,-trimethylhexamethylene terephthalamide or poly-m-phenylene isophthalamide; and also copolymers of the aforementioned polyamides with polyolefins, olefin copolymers, ionomers or chemically bonded or grafted elastomers; or with polyethers, as with polyethylene glycols, polypropylene glycols or polytetramethylene glycols; polyamides or copolyamides modified with EPDM or ABS; polyamides condensed during processing (RIM polyamide systems).

16. Polyureas, polyimides, polyamide-imides and polybenzimidazoles.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly[2,2,-(4-hydroxyphenyl)propane] terephthalate and polyhydroxybenzoates as well as block copolyether esters derived from hydroxyl-terminated polyethers; and also polyester modified with polycarbonates or MBS.

18. Polycarbonates and polyester carbonates.

19. Polysulfones, polyether sulfones and polyether ketones.

20. Polyethers of digylcidyl compounds, typically diglycidyl ethers and diols, e.g. of the diglycidyl ether of bisphenol A and bisphenol A.

21. Natural polymers, such as cellulose, rubber, gelatin and chemically modified homologous derivatives thereof, such as cellulose acetates, cellulose propionates and cellulose butyrates, or the cellulose ethers such as methyl cellulose; as well as rosins and their derivatives.

22. Blends of the aforementioned polymers (polyblends), for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 66 and copolymers, PA/HDPE, PA/PP, PA/PPO, PC/poly (epichlorohydrin).

Preferred thermoplastic polymers are polyolefins, polystyrene, polyvinyl chloride, polyvinylidene chloride, polyvinylidene fluoride, polyacrylates, polymethacrylates, polyamides, polyesters, polycarbonates, aromatic polysulfones, aromatic polyethers, aromatic polyether sulfones, polyimides and polyvinyl carbazole.

The thermosetting and structurally crosslinked polymers may be typically the following polymers:

1. Crosslinked polymers which are derived from aldehydes on the one hand and phenols, ureas and melamines on the other hand, such as phenol/formaldehyde resins, urea/formaldehyde resins and melamine/formaldehyde resins.

2. Drying and non-drying alkyd resins.

3. Unsaturated polyester resins which are derived from copolyesters of saturated and unsaturated dicarboxylic acids with polyhydric alcohols and vinyl compounds as crosslinking, agents, and also halogen-containing modifications thereof of low flammability.

4. Crosslinkable acrylic resins derived from substituted acrylic esters such as epoxy acrylates, urethane acrylates or polyester acrylates.
5. Alkyd resins, polyester resins or acrylate resins which are cross-linked with melamine resins, urea resins, polyisocyanates or epoxy resins.
6. Rubber derived from crosslinked polydienes, for example butadiene or isoprene; silicon rubber.
7. Epoxy resins which are derived from polyepoxides, for example from bisglycidyl ethers or from cycloaliphatic diepoxides, and which may contain a hardener as crosslinking agent or which are crosslinked thermally using curing accelerators or by irradiation.

Among the crosslinked polymers, crosslinked epoxy resins are preferred which, as poly-epoxides, are derived preferably from glycidyl compounds which contain on average two epoxy groups in the molecule. Particularly suitable glycidyl compounds are those which contain two glycidyl groups, β-methylglycidyl groups or 2,3-epoxycyclopentyl groups attached to a hetero atom (e.g. sulfur, preferably oxygen or nitrogen), in particular bis(2,3-epoxycyclopentyl) ether; diglycidyl ethers of polyhydric aliphatic alcohols, such as 1,4-butanediol, or polyalkylene glycols, such as polypropylene glycols; diglycidyl ethers of cycloaliphatic polyols, such as 2,2-bis(4-hydroxycyclohexyl)propane; diglycidyl ethers of polyhydric phenols, such as resorcinol, bis(p-hydroxyphenyl)methane, 2,2-bis-(p-hydroxyphenyl) propane (═diomethane), 2,2-bis(4'-hydroxy-3',5'-dibromophenyl)-propane, 1,3-bis(p-hydroxyphenyl)ethane; bis(β-methylglycidyl) ethers of the above dihydric alcohols or dihydric phenols; diglycidyl esters of dicarboxylic acids, such as phthalic acid, terephthalic acid, $\Delta_4$-tetrahydrophthalic acid and hexahydrophthalic acid; N,N-diglycidyl derivatives of primary amines and amides and heterocyclic nitrogen bases which contain two N-atoms, and N,N'-diglycidyl derivatives of disecundary diamides and diamines, such as N,N-diglycidylaniline, N,N-diglycidyltoluidine, N,N-diglycidyl-p-aminophenyl methyl ether, N,N'-dimethyl-N,N'-diglycidylbis(p-aminophenyl) methane; N',N"-diglycidyl-N-phenyl-isocyanurate; N,N'-diglycidyl ethyleneurea; N,N'-diglycidyl-5,5-dimethylhydantoin, N,N'-diglycidyl-5-isopropyl-hydantoin, N,N-methylenebis-(N',N'-diglycidyl-5,5-dimethylhydantoin), 1,3-bis(N-glycidyl-5,5-dimethylhydantoin)-2-hydroxypropane; N,N'-diglycidyl-5,5-dimethyl-6-isopropyl-5,6-dihydrouracil, triglycidyl isocyanurate.

A preferred group of epoxy resins comprises glycidylated novolaks, hydantoins, aminophenols, bisphenols and aromatic diamines or cycloaliphatic epoxy compounds. Particularly preferred epoxy resins are glycidylated cresol novolaks, bisphenol A and bisphenol F diglycidyl ether, hydantoin-N,N'-bisglycide, p-aminophenol triglycide, diaminodiphenylmethane tetraglycide, vinylcyclohexene dioxide, 3,4-epoxycyclohexyl-methyl-3,4-epoxycyclohexanecarboxylate or mixtures thereof.

Further suitable epoxy resins are prereacted adducts of such epoxy compounds with epoxy hardeners, for example an adduct of bisphenol A diglycidyl ether and bisphenol A, or adducts which have been prereacted with oligoesters which carry two terminal carboxyl groups and epoxides.

Suitable hardeners for epoxy resins are acid or basic compounds. Illustrative examples of suitable hardeners are: polyhydric phenols (resorcinol, 2,2-bis(4-hydroxyphenyl) propane) or phenol-formaldehyde resins; polybasic carboxylic acids and the anhydrides thereof, such as phthalic anhydride, tetrahydrophthalic anhydride, hexahydrophthalic anhydride, 4-methylhexahydrophthalic anhydride, 3,6-endomethylene-tetrahydrophthalic anhydride, 4-methyl-3,6-endomethylen-tetrahydrophthalic anhydride (methylnadic anhydride), 3,4,5,6,7,7-hexachloroendomethylene-tetrahydrophthalic anhydride, succinic anhydride, adipic anhydride, trimethyladipic anhydride, sebacic anhydride, maleic anhydride, dodecylsuccinic anhydride, pyromellitic dianhydride, trimellitic anhydride, benzophenonetetracarboxylic dianhydride, or mixtures of such anhydrides.

A preferred group of hardeners comprises novolaks and polycarboxylic anhydrides.

The epoxy resins can also be additionally cured with curing accelerators or only with thermal curing catalysts. Exemplary of curing accelerators and catalysts are 3-ethyl-4-methylimidazole, triamylammonium phenolate; mono- or polyphenols (phenol, diomethane, salicylic acid); boron trifluoride and the complexes thereof with organic compounds, such as boron trifluoride ether complexes and boron trifluoride amine complexes ($BF_3$/monoethylamine complex); phosphoric acid and triphenylphosphite.

Curing accelerators and catalysts are normally added in an amount of 0.1 to 10% by weight, based on the epoxy resin. Hardeners for epoxy resins are normally used in equimolar amounts, based on the epoxy groups and functional groups of a hardener.

Thermosetting or crosslinked polymers are also photo resists, X-ray resists, electron and ion beam resists and photopolymers. Examples of suitable radiation polymerized polymers are as follows (see, for example, A. Reiser, Photoreactive Polymers, John Wiley & Sons, New York (1989)):

1. Negative resists, such as dichromated polymers, e.g., dichromated gelatine, starch, poly(vinyl alcohol), poly (vinylpyrrolidone), poly(vinyl butyral) and poly(amide acid); polymers having crosslinking groups in side chains, such as poly(vinyl cinnamate), poly(vinyl cinnamylidene acetate), poly(vinyl alcohol) to which chalcone or phenylene diacrylate are attached and polyesters of p-phenylenediacrylic acid with glycols; water processable resists such as styrene-maleic anhydride copolymer, phenolic quatenary pyridinium salts, polymeric styrylquinolinium salts; bis-azide resists based on poly(cis-isoprene) and bis-azides, such as 2,6-bis(4-azidobenzal)-4-methylcyclohexanone, 4,4'-diazidostilbene, 4,4'-diazidobenzophenone and 4,4'-diazidobenzalacetone; water processable azido resists based on poly(acrylamide) or poly(vinylpyrrolidone) and water soluble bis-azides; azide resists based on poly(vinyl phenol) and mono-azides; poly(vinyl alcohol) and poly(vinylpyridine) to which a bifunctional acrylsilane is added; photocrosslinking copolymers of vinyl benzophenone and 4-dimethylaminostyrene; as well as crosslinked polymers from these polymers.
2. Photopolymers containing monomers, such as acrylates, methacrylates, acrylamide and styrene, crosslinkers, such as 1,6-hexanediol diacrylate, triethyleneglycol diacrylate, N,N'-methylenebis(acrylamide), trimethylolpropanetriacrylate, pentaerythritol triacrylate and pentaerythritol tetraacrylate, binders such as polymers of the monomers used, polyesters, polyurethanes, nylons, polycarbonates and cellulose derivatives, fillers such as organophilic silicates and clays, initiators such as benzoin derivatives, anthraquinone plus hydrogen donors, and benzophenones and amines, and stabilisers, such as p-methoxyphenol, hydroquinones and naphthols; especially those containing reactive binders such as unsaturated polymers obtained by the condensation of maleic and fumaric acid with glycols, polyfunctional acrylates based on bisphenol A or a polyfunctional prepolymers; as well as crosslinked polymers of these photopolymers.

3. Positive resists, such as diazoquinone resists based on phenolic resins, e.g., novolak and diazonaphthoquinones.
4. Positive deep-UV resists, such as modified diazoquinone resist based on novolak and diazopyrazolidine dione, diazotetramic acid, diazopiperidine dione and diazo-Mendrum's acid; resists based on o-nitrobenzyl esters; o-nitrobenzyl-substituted polyethers; m-polynitroanilide; poly(p-acetoxystyrene); poly(methyl methacrylate) derivatives, such as 3-oximono-2-butanone methacrylate (OMMA)-methyl methacrylate copolymer, OMMA-methacrylonitrile-methyl methacrylate terpolymer, methyl methacrylate-indene-copolymer; poly(methylisopropylketone); polymers containing triphenylcarbonium ion in their backbone; poly(tert-butoxycarbonyloxystyrene), preferably with an onium salt acid generator; novolak with carbonates and onium salt or with naphthalene-2-carboxylic acid-tert-butyl ester; copolymers of phthalaldehyde with o-nitrobenzaldehyde.
5. Negative deep-UV resists, such as bis-azide-cyclized rubber composition containing 4,4'-diazidodiphenyl sulfide, bis-azido-poly(vinyl phenol) composition containing 3,3'-diazidodiphenyl sulfon and bis-azido-poly(methyl methacrylate) composition containing 3,3'-diazidodiphenyl sulfon, epoxides with onium salts or with n-hexyloxydiazonium hexafluorophosphate.
6. Positive electron resists, such as PMMA derivatives, e.g., poly(perfluorobutyl methacrylate), poly(hexafluoromethacrylate) and especially poly(2,2,2-trifluoroethyl-α-chloroacrylate); copolymers of MMA with methacrylic acid, acrylonitrile or methacrylic anhydride; terpolymers of MMA, methacrylic acid and methacrylic anhydride; poly(olefine sulfones), such as poly(butene sulfon); novolaks with poly(olefine sulfon), such as poly(2-methylpentene-1-sulfon); poly(p-tert-butoxycarbonyl oxystarene); poly(ortho-substituted 2-phenylethyl methacrylates); polystyrene-tetrathiofulvalene.
7. Negative electron resists, such as epoxydized poly(butadiene), poly(glycidyl methacrylate), copolymers of glycidyl methacrylate with ethylacrylate; copolymers of allyl methacrylate with hydroxyethyl methacrylate; copolymers of propargyl methacrylate with hydroxyethyl methacrylate; polystyrene based resists, such as iodonated polystyrene and poly(chloromethylstyrene); poly(vinyl naphthalenes); poly(chloromethylstyrene-co-2-vinyl naphthalene); poly(vinyl pyridine) quaternized with methyl iodine; diazoquinone-novolak photoresists; as well as crosslinked polymers from these polymers.
8. Positive X-ray resists, such as Olin-Hunt resist HPR-204 (a commercial product).
9. Negative X-ray resists, such as poly(2,3-dichloro-1-propyl acrylate), poly(chloromethylstyrene), chlorinated polymethylstyrene, copolymers of allyl methacrylate with 2-hydroxyethyl methacrylate or glycidylmethacrylate; crosslinked polymers from these polymers.
10. Positive ion beam resists, such as poly(methyl methacrylate), poly(methylvinyl ketone), poly(tert-butyl methacrylate) and poly(butene sulfone).
11. Negative ion beam resists, such as poly(vinyl acetate), poly(vinyl cinnamate), poly(methyl siloxane), poly(glycidyl methacrylate-co-ethyl acrylate), poly(styrene), poly(4-chlorostyrene), poly(4-bromostyrene) and novolaks; crosslinked polymers from these polymers.
12. Silicon-containing positive resists, such as poly(dimethylsiloxane), poly(phenylmethylsiloxane) and siloxane-substituted propyl methacrylates.
13. Silicon-containing negative resists, such as copolymers of trimethylsilylmethylstyrene with chlorostyrene, chloromethylated polydiphenyl siloxane, brominated poly(1-trimethylsilyl propylene), poly(triallylphenylsilane) together with 2,6-bis(4'-azidobenzal)-methylcyclohexanone, and poly(trimethylsilylmethylstyrene) in combination with 1,2,4-trichlorobenzene and 3,3'-diazidodiphenyl sulfone; as well as crosslinked polymers from these polymers.

These photo-, X-ray, electron- and ion beam resists and photopolymers are well known in the art.

The composition of the present invention can be produced by simply mixing a thermoplastic polymer (or a prepolymer or monomer component of a thermosetting or cross-linkable polymer), an electron donor and an electron acceptor, either the electron donor or the electron acceptor being weakly-soluble in said polymer, prepolymer or monomer, then accomplishing an in-situ reaction by the introduction of energy (heat and/or actinic radiation) to this reaction mixture, and finally crosslinking the polymer, if necessary.

The production of the composition of the present invention does not need any solvent.

In the above process, an electroconductive network system comprising uniformly distributed finely divided particles of the polymer weakly-soluble component and crystals of the CT-crystals crown from these particles is formed, whereby the crystal needles penetrate the polymer mass.

Another object of the instant invention is a process for the preparation of the above described composition, characterized in that (1) either at least one finely divided weakly polymer-soluble electron acceptor or electron donor is dispersed and uniformly distributed in a molten thermoplastic and at least one polymer-soluble electron acceptor or at least one polymer-soluble electron donor is dissolved in the molten thermoplastic polymer; or (2) either at least one finely divided weakly polymer-soluble electron acceptor or electron donor is dispersed and uniformly distributed in at least one monomer or prepolymer component of a thermosetting or structurally cross-linkable polymer and at least one polymer-soluble electron acceptor or at least one polymer-soluble electron donor is dissolved in one and the same or in another monomer or prepolymer component of a thermosetting or structurally cross-linkable polymer, and polymerizing the mixture optionally together with further monomer or prepolymer components of a thermosetting or structurally cross-linkable polymer; and (3) heating the polymer composition for a time sufficient to form the network of crystal needles.

The electron donor is used in an amount of $10^{-3}$ to 2% by weight, preferably $10^{-1}$ to 1% by weight, based on the thermoplastic polymer or the prepolymer or monomer component of the thermosetting or crosslinkable polymer. The electron acceptor is used in an amount of $10^{-3}$ to 2% by weight, preferably $10^{-2}$ to 1% by weight, based on the electron donor. If the electron donor is a compound of the aforementioned formula I or Ia and the thermoplastic polymer or the prepolymer or monomer component of the thermosetting or crosslinkable polymer is a halogen-containing one, it is not necessary to add an electron acceptor. For example, if the thermoplastic polymer is polyvinyl chloride, polychloroprene, polyvinylidene chloride or the like, it is not necessary to add an electron acceptor.

The particle size of the weakly polymer-soluble electron donor or acceptor is 10 nm to 20 μm, most preferably 50 nm to 5 μm.

If the polymer matrix is to be made of a thermoplastic polymer, the thermoplastic polymer is firstly fused at a temperature higher than its melting point and lower than its decomposition temperature, to which the electron donor and the electron acceptor, either the electron donor or the electron acceptor being finely divided, weakly polymer-soluble particles and the other being polymer-soluble, are added in such a manner that the weakly polymer-soluble component is dispersed and uniformly distributed (step (1)). Then this mixture is moulded by a conventional method, such as injection, extrusion, pressing and calender moulding, at a temperature and for a time sufficient for forming the network of crystal needles (step (3)). The moulding is accomplished at a temperature of 100° to 350° C., preferably 120° to 250° C. for 5 minutes to 2 hours, preferably 10 minutes to 30 minutes hours. The above mixture, composed of the fused thermoplastic polymer, the electron donor and the electron acceptor, may also be coated on a suitable substrate, such as a glass plate, photofilm or a printed circuit board and, then, subjected to the formation of the network of crystal needles. Preferred conditions for the network formation are the same as those mentioned above.

If the polymer matrix is to be made of a thermosetting or structurally crosslinked polymer, the electron donor and the electron acceptor, either the electron donor or the electron acceptor being weaklypolymer-soluble and the other being polymer-soluble, are added to at least one monomer or prepolymer component of a thermosetting or structurally crosslinkable polymer in such a manner that the weakly polymer-soluble component is uniformly dispersed in the monomer or prepolymer component. Herein, it is understood that "weakly polymer-soluble" means weakly monomer-soluble (weakly prepolymer-soluble) and "polymer-soluble" means monomer-soluble (prepolymer-soluble). The electron donor and the electron acceptor together can be added to the same monomer or prepolymer component, or they can each be added to different monomer or prepolymer components. In the latter case, the two mixtures are subsequently mixed with each other. When the monomer or prepolymer component consists of a plurality of monomers and/or prepolymers, the monomer of prepolymer ingredients are selected such that they yield a copolymer satisfying the desired material properties, e.g. transparency, thermal expansion, tensile strength, elasticity, heat resistance, chemical resistance and flame resistance. If necessary, further monomers or prepolymers of a thermosetting or structurally cross-linkable polymer may be added. The nomomer or prepolymer component is then polymerized (step (2)).

If the monomer or prepolymer component is that of a thermosetting polymer, the polymerization and the formation of the network of crystal needles (step(3)) are carried out preferably by means of the moulding or coating method as described above. Preferred temperatures for thermal polymerization are well known in the art for each thermosetting polymer. Preferred temperatures for the formation of crystal needles are already mentioned in the above. However, if the crystal needle formation takes place during the polymerization of the monomer or prepolymer component, it is not necessary to further heat the composition for this purpose. This can be assessed easily by microscopic observation.

If the monomer or prepolymer component is a photopolymer or a photoresist, the above prepared system, consisting of the monomer or prepolymer component, the electron donor and electron acceptor, is preferably applied to a suitable substrate such as a glass plate, a printed circuit board or any article whose surface is to be made electroconductive. The polymerization of the monomer or prepolymer component is effected by actinic radiation and simultaneous heating or heating after radiation. Preferred conditions of radiation and heating are well known in the art. Preferred temperatures and duration of heating for the formation of the network of crystal needles are already given above.

The moulding method is suitable for the production of electroconductive formed articles, whilst the coating method is advantageous for the production of electroconductive composites such as laminates comprising a dielectric film and an electroconductive or antistatic film or for the production of electroconductive or antistatic coating.

In the above process for the preparation of the composition of the instant invention, when one selected from the group consisting of halogen-containing organic compounds, including halogen-containing monomers, prepolymers and polymers and halogen containing matrix polymers, is used as an electron acceptor, the system prepared in step (1) or (2) is heated at a temperature between room temperature and 350° C., preferably from 50° to 200° C., in order to cleave the halogen atoms so that they effectively form CT-crystals with the incorporated electron donor.

The thus produced composition of the present invention usually shows an electroconductivity of $10^{-10}$ to 10 S/cm depending on the CT complex, its concentration and the type of the donor.

In the present invention, it is always possible to form an electroconductive network of percolated CT-crystals at any concentration of the polymer weakly-soluble component (donor or acceptor). If the CT-crystals growing from the polymer weakly-soluble component are not long enough to achieve percolation, the percolation can be achieved by reducing the initial particle size of the polymer weakly-soluble component. Therefore, electroconductivity ranging from $10^{-10}$ to 10 S/cm as mentioned above is readily achieved.

Because of the simplicity in controlling electroconductivity, the composition of the present invention can be applied in various fields in accordance with the required electroconductivity in form of moulded articles, such as electroconductive bulk articles, e.g. conveyer belts, pipes, bags, flooring plates, electrodes and electroconductors, or as electroconductive composites, such as laminates comprising a dielectric material e.g. a photofilm and an electroconductive or antistatic film, or for the production of electroconductive or antistatic coatings. In particular, the composition of the present invention is pre-eminently suitable for use as transparent antistatic films with small haze problem since networks of percolated CT-crystals, the crystals having a cross-section diameter smaller than that of light wavelength, can easily be formed at such low donor and acceptor concentrations that practically do not affect the transparency of the films. Moreover, since the composition of the present invention is produced in an in-situ process without using any solvent, the method for the production of the instant composition is environment very safe.

Figure 2:
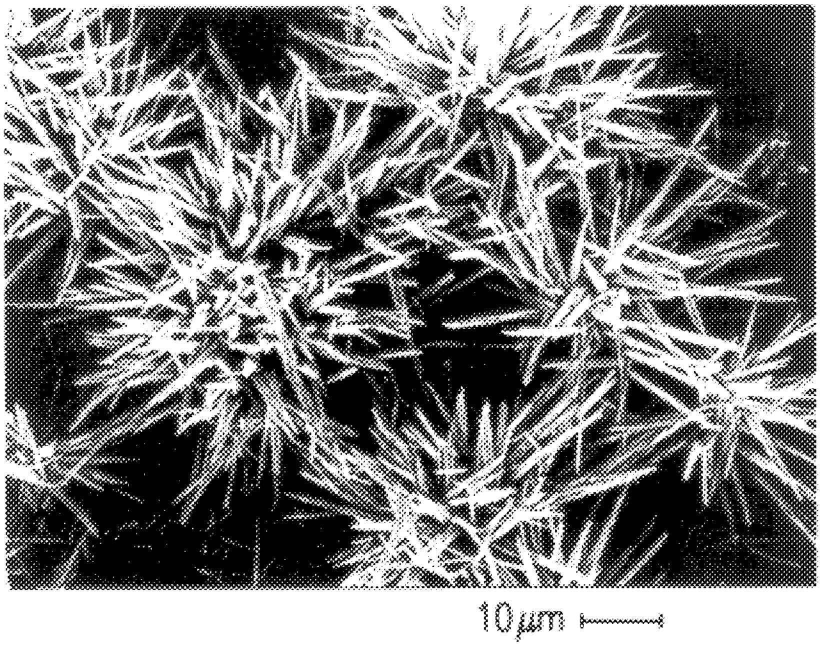
Figure 3:
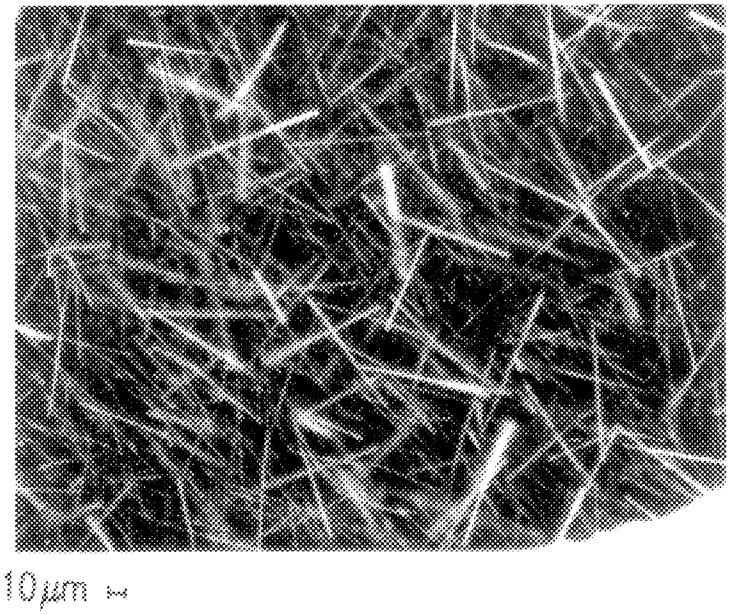

The difference between the composition of the instant invention and a prior art composition is shown in FIGS. 1 and 3. The prior art composition comprises a polymer matrix and an electroconductive net-work of crystal needles of a CT complex without any weakly polymer-soluble electron donor and acceptor. FIG. 1 is a microscope image of a composition of the instant invention comprising a low density polyethylene matrix, tetrathiotetracene as weakly polymer-soluble electron donor particles and a CT complex of said tetrathiotetracene with a polymer-soluble electron accepetor tetrahexylammonium-$CuCl_2$ (obtained from Example 1 below). FIG. 3 is a microscope image of the prior art composition comprising a phenoxy resin matrix and a CT complex of tetrathiotetracene with $CuCl_2$ (0.5% tetrathiotetracene-$(CuCl_2)_{0.45}$ in phenoxy resin, sprayed from a solution). FIG. 1 clearly shows that crystal needles grow from the weakly polymer-soluble particles and are formed in the polymer mass as microcrystalline needles, which are in contact and connect the weakly polymer-soluble particles, thus forming a network which penetrates the polymer mass, while FIG. 3 shows only a network of needle crystals of the CT complex. FIG. 2 shows another way to achieve percolation according to the instant invention (obtained from Example 2 below), where a star-like growth out of the seed crystal is obtained.

EXAMPLES

Example 1

Preparation of electroconductive network by reaction of tetrathiotetracene-particles with tetrahexylammonium-$CuCl_2$ in low density poly(ethylene)

50 g of low density poly(ethylene) (hereinafter, referred to as LD-PE, Lupolen 1840D) together with 1 wt % tetrathiotetracene (hereinafter, referred to as TTT, 0.1–5 μm in particle size) and 1.5 wt % tetrahexylammonium-$CuCl_2$ (hereinafter, referred to as $THACuCl_2$) are mixed in a mixer, and this mixture is processed on calender at a temperature of 120° C. for 5 minutes. The thus prepared foil is cut into pieces, and a plate is prepared therefrom under a press under heating at 160° C. for 5 minutes. The obtained 2 mm thick plate is homogeneous and has a green color. A portion of this plate is placed under a Reichert Hot Microscope and heated to 180° C. The formation of needle crystals, which begins after 15 minutes, is documented and is complete after about 2 hours. It is observed that a dense, percolated and electro-conductive network is formed. The surface resistance of this composition determined by the two-probe method is $10^6$ Ohm. (Two Pt-paste electrodes of 1 cm length are painted 0.2 cm apart on the surface.)

Example 2

Preparation of needle networks from TTT and $CuCl_2$ crystals by reaction of $CuCl_2$-particles with TTT Finely milled $CuCl_2$-salt (anhydous) having a particle size of 0.5–3 μm is placed on a glass plate coated with a gelatin (Fluka, low gel strength) layer. (The gelatin layer is provided in order to fix the particles so that they are not lost during the following process.) Then a saturated TTT-solution (anisole; 0.2 g TTT/l) is slowly applied to the gelatine layer, and the crystal growth is observed under a microscope and documented. The crystal growth is complete after about 1 hour at room temperature. It is observed that star-like crystals are formed. These crystals form a percolated electroconductive network. The surface-resistance of this composition determined by two-probe method is $10^8$ Ohms. (The electrodes are formed in the same way as in Example 1.)

What is claimed is:

1. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles, are in contact with and connect the weakly polymer-soluble particles to form a network which penetrates the polymer mass;

wherein said electron acceptor is a halogen-containing organic compound selected from the group consisting of tetrabromomethane, bromoform, trichlorobromomethane, hexachloropropane, hexachloropropene, hexachlorocyclopropane, hexachlorocyclopentadiene, hexachloroethane, N-chlorosuccinimide, octachloropropane, n-octachlorobutane, n-decachlorobutane, tetrabromoethane, hexabromoethane, tetrabromobenzoquinone, 2,4,4,6-tetrabromo-2,5-cyclohexadienone, hexabromobenzene, chloranil, hexachloroacetone, 1,4,5,6,7,7-hexachloro-5-norbornen-2,3-dicarboxylic acid, 1,2,5,6,9,10-hexabromocyclododecane, tetrachloroethylene, perchlorocyclopentadiene, perchlorobutadiene, dichloroacetaldehyde-diethylacetal, 1,4-dichloro-2-butene, 1,3-dichloro-2-butene, 3,4-dichloro-1-butene, tetrachlorocyclopropane, 1,3-dichloroacetone, 2,3,5,6-hexachloro-p-xylene, 1,4-bis(trichloromethyl)-benzene, 1,3-dibromopropane, 1,6-dibromohexane, 3-chloropropionic acid ethylester, 3-chlorotoluene, 2-chloropropionic acid methylester, 2-chloroacrylonitrile, trichloroacetic acid ethylester, 1,2,3-trichloropropane, 1,1,2-trichloroethane, chloroformic acid butylester, trichloroethylene, 2,3-dichloromaleic anhydride, 1,12-dibromododecane, α,α'-dibromo-p-xylene, α,α'-dichloro-o-xylene, phenacylchloride or-bromide, 1,10-dibromodecane, α,α'-dichloro-p-xylene, α,α'-dibromo-m-xylene, iodoacetonitrile, 2,3-dichloro-5,6-dicyanobenzoquinone, 2,3-dichloropropionic acid methylester, 1-bromo-2-chloroethane, 1-bromo-2-chloropropane, chloroformic acid-2-bromoethylester, iodoacetic acid ethylester, N-chloro-, N-bromo- or N-iodosuccinimide or -phthalimide, and mixtures thereof.

2. A composition according to claim 1, wherein the diameter of said particles lies between 10 nm to 20 μm.

3. A composition according to claim 1, wherein said crystals of a CT complex are contained in the polymer matrix in an amount of $10^{-3}$ to 2% by weight, based on the polymer.

4. A composition according to claim 1, wherein said crystals have a length of 0.1 μm to 1000 μm, and an aspect ratio (length:width ratio) of 1 to 10000.

5. A composition according to claim 1, wherein said electron donor is at least one compound of formula I or Ia or a mixture thereof

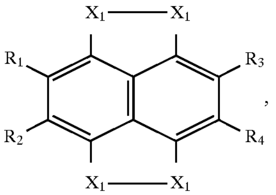

(I)

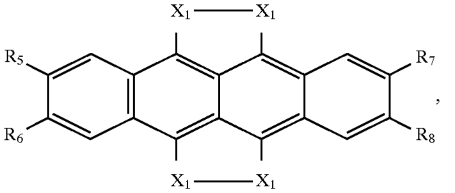

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each mean

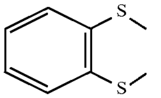 or 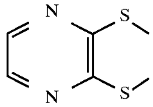 or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ mean each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by $NH_2$— group.

6. A composition according to claim 5, wherein said compound represented by formula I or Ia is 5,6,11,12-tetrathiotetracene, 5,6,11,12-tetraselenotetracene, 2-fluoro- or 2,3-difluoro-5,6,11,12-tetraselenotetracene, 2,3,8,9-tetramethyl-5,6,11,12-tetrathiotetracene, 2,3,8,9-tetramethyl-5,6,11,12-tetraselenotetracene, 2-methyl-5,6,11,12-tetrathiotetracene, 2,3,8,9-tetrafluoro-5,6,11,12-tetrathiotetracene, 2,3,8,9-tetrafluoro-5,6,11,12-tetraselenotetracene, 2,3-dichloro-5,6,11,12-tetraselenotetracene, 2-fluoro-5,6,11,12-tetratellurotetracene, 2,3,6,7-tetrathiophenyl-1,4,5,8-tetrathionaphthalene, 2,3,6,7-tetramethoxyphenyl-1,4,5,8-tetrathionaphthalene, 2,3,6,7-tetra-4-pyridylthio-1,4,5,8-tetrathionaphthalene, 2,3,6,7-tetraphenylthio-1,4,5,8-tetraselenonaphthalene, or the compound

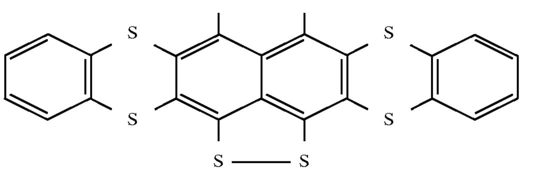

-continued

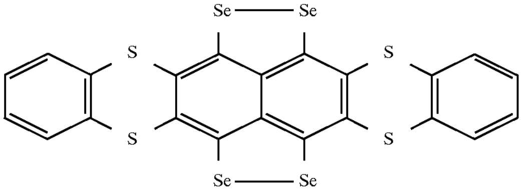 or

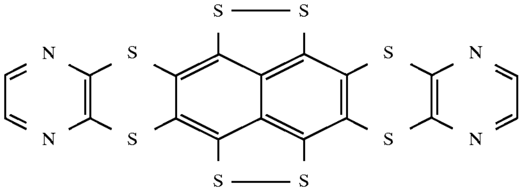

7. A composition according to claim 1, wherein said electron donor is at least one compound represented by formula II

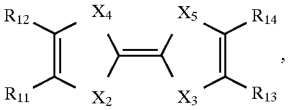

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ together are a residue of

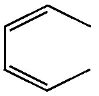

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or especially H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H and $R_{13}$ and $R_{14}$ together are a residue of

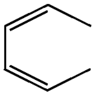

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ are Se or S.

8. A composition according to claim 1, wherein said electron donor is at least one compound of formula III

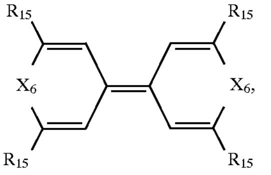

wherein $X_6$ is S, Se or N—$C_1$–$C_{12}$-alkyl and $R_{15}$ is H, $C_1$–$C_{12}$-alkyl or substituted or unsubstituted phenyl.

9. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is a halogen-containing organic compound selected from the group consisting of halogen-containing thermoplastic polymer containing aliphatic or cycloaliphatic side groups, which side groups are bound to the polymer backbone via a group —O—, —O—CO—, —CO—OA—OCO— or —CO—O— and contain at least one Cl-, Br- or I-atom in α-, β-, γ- or ω-position, wherein A is $C_2$–$C_{12}$-alkylene, $C_4$–$C_{12}$-cycloalkylene, $C_4$–$C_{12}$-cycloalkylene-$CH_2$—, $C_4$–$C_{12}$-cycloalkylene-$(CH_2)_2$—, benzylene or xylylene, which is unsubstituted or substituted by OH, Cl, Br or phenyl.

10. A composition according to claim 9, wherein the groups —O, —O—CO—, —CO—OA—O—CO— or —CO—O— have groups of the formula —$C_mH_nY_o$ bonded to them, wherein m is a number from 1 to 12, n is 0 or a number from 1 to 24, o is a number from 1 to 25 and n+o=2m+1, Y is Cl, Br or I and A is $C_2$–$C_{12}$-alkylene, $C_4$–$C_{12}$-cycloalkylene, $C_4$–$C_{12}$-cycloalkylene-$CH_2$—, $C_2$–$C_{12}$-cycloalkylene-$(CH_2)_2$—, benzylene or xylylene which is unsubstituted or substituted by OH, Cl, Br or phenyl.

11. A composition according to claim 9, wherein said thermoplastic polymer is a linear polyadduct of a glycidyl compound containing an average of more than one epoxy group, and a diol, a primary monoamine, a di-secondary diamine, a di-secondary linear or cyclic dicarboxylic acid diamide or a dicarboxylic acid, in which polyadduct the H atom of the secondary OH groups is at least partially substituted by a group —CO—$C_mH_nY_o$, wherein m is a number from 1 to 12, n is 0 or a number from 1 to 24, o is a number from 1 to 25 and n+o=2m+1, and Y is Cl, Br or I.

12. A composition according to claim 9, wherein said thermoplastic polymer is a polyadduct containing a) 100 to 0.1 mol % of identical or different structural units of formula IV

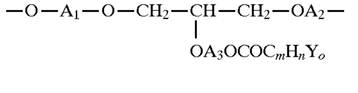 (IV)

and b) 99.9 to 0 mol % of identical or different structural units of formula V

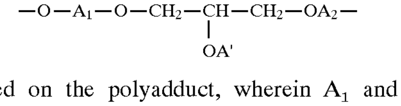 (V)

based on the polyadduct, wherein $A_1$ and $A_2$ are each independently of the other the radical of a diol containing aliphatic or aromatic diol groups, from which two hydroxyl groups have been removed, A' is H, unsubstituted or OH-substituted $C_1$–$C_{20}$-alkyl, $C_1$–$C_{20}$-acyl or aminocarbonyl N-substituted by a $C_1$–$C_{20}$-hydrocarbon radical, —$OA_3$— is a direct bond or $A_3$ is ethylene which is unsubstituted or substituted by $C_1$–$C_{16}$-alkyl.

13. A composition according to claim 12, wherein $A_1$ and $A_2$ are each independently of the other a radical of the formula

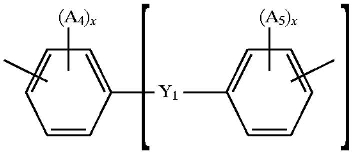

wherein $Y_1$ is a direct bond, $C_1$–$C_4$-alkylene, $C_2$–$C_{12}$-alkylidene, $C_5$–$C_8$-cycloalkylidene, —O—, —S—, —SO—, —$SO_2$—, —CO—, —$CO_2$—, —N($C_1$–$C_4$-alkyl)- or —Si$(CH_3)_2$—, $A_4$ and $A_5$ are independently of the other H, halogen, $C_1$–$C_4$-alkyl or $C_1$–$C_4$-alkoxy, x is 0, 1 or 2 and y is 0 or 1.

14. A composition according to claim 12, wherein $A_1$ and $A_2$ are the radical

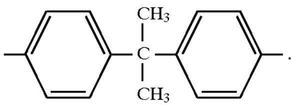

15. A composition according to claim 9, wherein the thermoplastic polymer contains a) 0.1 to 100 mol % of at least one structural unit of formula VI

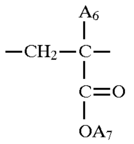 (VI)

and b) 0 to 99.9 mol % of at least one structural unit of formula VII

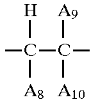 (VII)

based on the polymer, wherein $A_6$ is H or methyl; $A_7$ is a radical —(A—O—CO$)_z$—$C_mH_nY_o$, wherein z is 0 or 1, m is a number from 1 to 12, n is 0 or a number from 1 to 24, o is a number from 1 to 25 and n+o=2m+1, Y is Cl, Br or I and A is $C_2$–$C_{12}$-alkylene, $C_4$–$C_{12}$-cycloalkylene, $C_4$–$C_{12}$-cycloalkylene-$CH_2$—, $C_2$–$C_{12}$-cycloalkylene-$(CH_2)_2$—, benzylene or xylylene which is unsubstituted or substituted by OH, Cl, Br or phenyl; $A_8$ is H, $C_1$–$C_6$-alkyl or —$COOA_{11}$; $A_9$ is H, F, Cl, CN or $C_1$–$C_6$-alkyl; and $A_{10}$ is H, F, Cl, CN, $A_{11}$—O—, $C_1$–$C_{12}$-alkyl, —$COOA_{11}$, —O—CO—, —$A_{11}$, —COOA—OH,

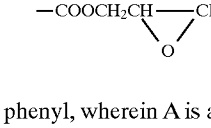

or phenyl, wherein A is as defined above and $A_{11}$ is $C_1$–$C_{18}$-alkyl, $C_5$–$C_7$-cycloalkyl, ($C_1$–$C_{12}$-alkyl)-$C_5$–$C_7$-cycloalkyl, phenyl, ($C_1$–$C_{12}$-alkyl)phenyl, benzyl or ($C_1$–$C_{12}$-alkyl) benzyl.

16. A composition according to claim 9, wherein the thermoplastic polymer contains a) 90 to 0.1 mol % of structural units of formula VIII

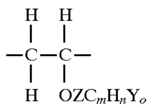 (VIII)

and b) 99.9 to 10 mol % of identical or different structural units of formula IX

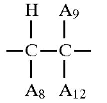 (IX)

wherein Z is a direct bond, —CO— or —$A_3$—O—CO—, $A_3$ being ethylene which is unsubstituted or substituted by $C_1$–$C_{16}$-alkyl; Y is Cl, Br or I; m is a number from 1 to 12, n is 0 or a number from 1 to 24, o is a number from 1 to 25 and n+o=2m+1; $A_{12}$ is H, $C_1$–$C_6$-alkyl or —$COOA_{11}$; $A_9$ is H, F, Cl, CN or $C_1$–$C_6$-alkyl; and $A_{12}$ is H, F, Cl, CN, OH, $A_{11}$O—, $C_1$–$C_{12}$-alkyl, —$COOA_{11}$, —O—CO—$A_{11}$, —OAOH or phenyl, $A_{11}$ being $C_1$–$C_{18}$-alkyl, $C_5$–$C_7$-cycloalkyl, ($C_1$–$C_{12}$-alkyl)-$C_5$–$C_7$-cycloalkyl, phenyl, ($C_1$–$C_{12}$-alkyl)phenyl, benzyl or ($C_1$–$C_{12}$-alkyl)benzyl and A being ethylene which is unsubstituted or substituted by $C_1$–$C_{16}$-alkyl.

17. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is at least one salt of an oxidatively acting cation of a transition metal or rare earth metal with a non-nucleophilic anion selected from the group consisting of halogen ($F^{\ominus}$, $Cl_{\ominus}$), $BF_4^{\ominus}$, $SbF_6^{\ominus}$, $AsF_6^{\ominus}$ and $PF_6^{\ominus}$.

18. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is selected from the group consisting of $CuCl_2$ and $CuBr_2$ and their aquo, solvent or ammonium complexes.

19. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is at least one tetracyanoethylene or tetracyanoquinodimethane of formula X, or at least one N,N'-dicyanoquinodimethane of formula XI, or a mixture thereof

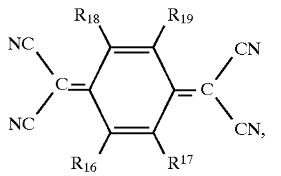 (X)

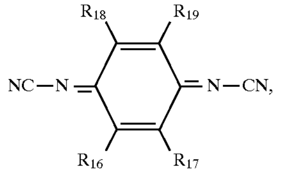 (XI)

wherein $R_{16}$, $R_{17}$, $R_{18}$ and $R_{19}$ are each independently of one another $C_1$–$C_{12}$-alkyl, $C_1$–$C_{12}$-alkoxy, $C_1$–$C_{12}$-alkylsulfido, phenyl, halogen, —CN or H, $R_{16}$ and $R_{17}$ are together a residue of

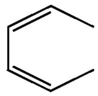 ,

—$(CH_2)_m$—, —$(CH_2)_m$—O—$(CH_2)_m$— or —O—$(CH_2)_m$—O—, m is an integer 1–12 and $R_{18}$ and $R_{19}$ are each independently of the other $C_1$–$C_{12}$-alkyl, $C_1$–$C_{12}$-alkoxy, $C_1$–$C_{12}$-alkylsulfido, phenyl, halogen, —CN or H, or $R_{16}$ and $R_{17}$ are each independently of the other $C_1$–$C_{12}$-alkyl, $C_1$–$C_{12}$-alkoxy, $C_1$–$C_{12}$-alkylsulfido, phenyl, halogen, —CN or H and $R_{18}$ and $R_{19}$ are together a residue of

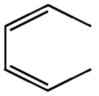

, $-(CH_2)_m-$, $-(CH_2)_m-O-(CH_2)_m-$ or $-O-(CH_2)_m-O-$, m is an integer 1–12, in which the condensed aromatic rings may be substituted by one or two chlorine or bromine atoms or $C_1$–$C_4$-alkoxy and/or $C_1$–$C_4$-alkyl groups.

20. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is at least one metal complex of formula XII

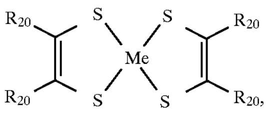

(XII)

wherein Me is Pt or Pd, and $R_{20}$ is $-CN$, $-CH_3$ or $-CF_3$.

21. A composition comprising a matrix of a thermoplastic, thermosetting or a structurally crosslinked polymer, in which is incorporated an electroconductive network of crystal needles of a charge transfer complex (abbreviated to CT complex) from an electron donor and an electron acceptor, characterized in that (1) the matrix contains uniformly distributed an excess, with respect to the CT complex formation, either of at least one electron donor or at least one electron acceptor as weakly polymer-soluble finely divided particles, (2) the CT complex is formed either by at least one weakly polymer-soluble electron donor and at least one polymer-soluble electron acceptor or by at least one weakly polymer-soluble electron acceptor and at least one polymer-soluble electron donor, and (3) microcrystalline needles grow from the weakly polymer-soluble particles in the polymer mass, which microcrystalline needles are in contact with and connect the weakly polymer-soluble particles to form a network which penetrates the polymer mass;

wherein said electron acceptor is a quinone.

22. A composition according to claim 1, wherein said CT complex is represented by general formula XIII $$(D)(A)_n \qquad \text{(XIII)},$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

23. A composition according to claim 22, wherein the electron donor D is selected from 5,6,11,12-tetrathiotetracene, 5,6,11,12-tetraselenotetracene, 2-fluoro- or 2,3-difluoro-5,6,11,12-tetraselenotetracene, 2,3,8,9-tetramethyl-5,6,11,12-tetrathiotetracene, 2,3,8,9-tetramethyl-5,6,11,12-tetraselenotetracene, 2-methyl-5,6,11,12-tetrathiotetracene, 2,3,8,9-tetrafluoro-5,6,11,12-tetrathiotetracene, 2,3,8,9-tetrafluoro-5,6,11,12-tetraselenotetracene, 2,3-dichloro-5,6,11,12-tetraselenotetracene, 2-fluoro-5,6,11,12-tetratellurotetracene, 2,3,6,7-tetrathiophenyl-1,4,5,8-tetrathionaphthalene, 2,3,6,7-tetramethoxyphenyl-1,4,5,8-tetrathionaphthalene, 2,3,6,7-tetra-4-pyridylthio-1,4,5,8-tetrathionaphthalene, 2,3,6,7-tetraphenylthio-1,4,5,8-tetraselenonaphthalene, or the compound

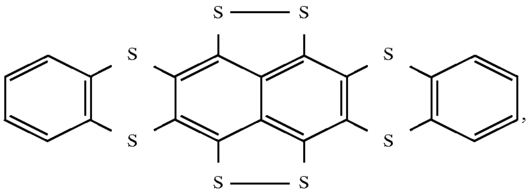

,

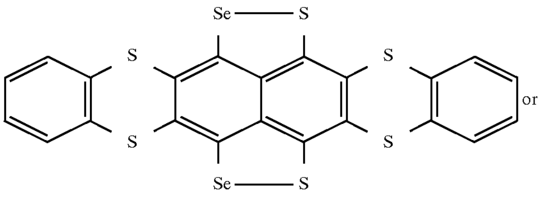

or

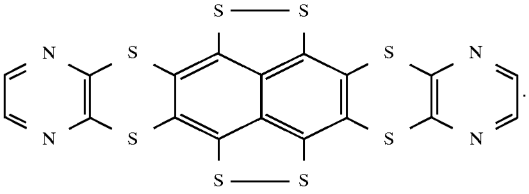

.

24. A composition according to claim 22, wherein the electron donor D is 5,6,11,12-tetrathiotetracene or 5,6,11,12-tetraselenotetracene.

25. A composition according to claim 9, wherein said electron donor is at least one compound of formula I or Ia or a mixture thereof

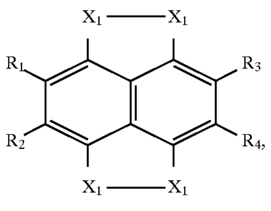

(I)

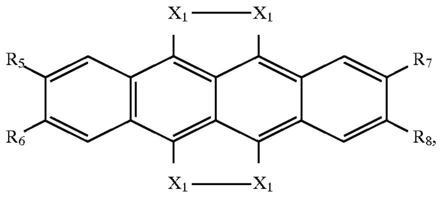

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

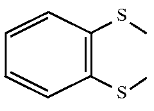

or

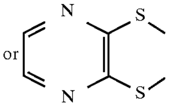

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by an $NH_2$— group.

26. A composition according to claim 9, wherein said electron donor is at least one compound represented by formula II

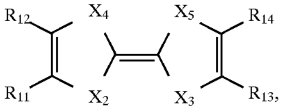

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ together are a residue of

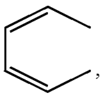

,

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1C_{12}$-alkyl, phenyl, $C_1$–$C_{12}$-alkylphenyl, $C_1$–$C_{12}$-alkoxyphenyl or H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

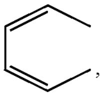

,

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ are Se or S.

27. A composition according to claim 9, wherein said electron donor is at least one compound of formula III

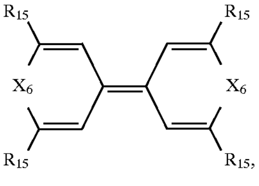

(III)

wherein $X_6$ is S, Se or N—$C_1$–$C_{12}$-alkyl and $R_{15}$ is H, $C_1$–$C_{12}$-alkyl or substituted or unsubstituted phenyl.

28. A composition according to claim 9, wherein said CT complex is represented by general formula XIII $$(D)(A)_n \qquad \text{(XIII)},$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

29. A composition according to claim 9, wherein said electron donor is at least one compound of formula I or Ia or a mixture thereof

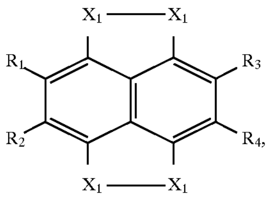

(I)

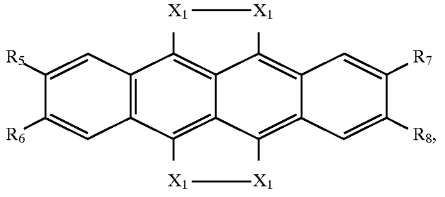

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

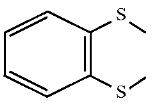

or

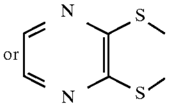

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by an $NH_2$— group.

30. A composition according to claim 17, wherein said electron donor is at least one compound represented by formula II

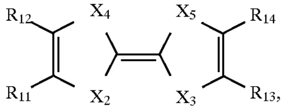

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or especially H, or $R_{11}$ and $R_{12}$ together are a residue of

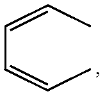

,

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$- alkylphenyl, $C_1$–$C_{12}$-alkoxyphenyl or H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

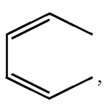

$—(CH_2)_p—$, $—C(CH_3)_2—(CH_2)_p—C(CH_3)_2—$ or $—S—(CH_2)_p—S—$, p is an integer 1–12, and $X_2$, $X_3$, $X_4$ and $X_5$ are Se or S.

31. A composition according to claim 17, wherein said electron donor is at least one compound of formula III

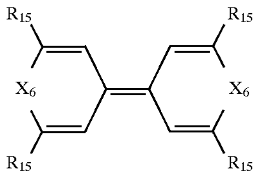

(III)

wherein $X_6$ is S, Se or $N—C_1$–$C_{12}$-alkyl and $R_{15}$ is H, $C_1$–$C_{12}$-alkyl or substituted or unsubstituted phenyl.

32. A composition according to claim 17, wherein said CT complex is represented by general formula XIII $$(D)(A)_n \qquad (XIII),$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

33. A composition according to claim 18, wherein said electron donor is at least one compound of formula I or Ia or a mixture thereof

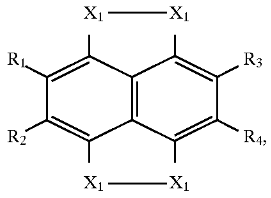

(I)

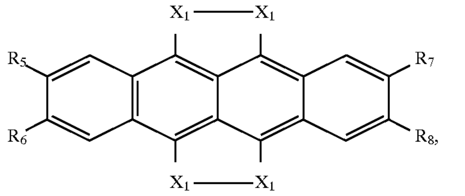

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

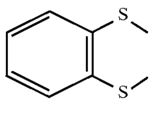

or

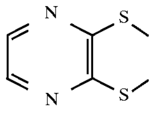

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is $—COR_9$ and $R_8$ is H or $—COR_9$, or $R_5$ and $R_6$ are H and $R_7$ and $R_8$ together are —CO—O—CO or $—CO—NR_{10}—CO—$, $R_9$ is halogen, —OH, $—NH_2$, or the residue of an alcohol or of primary or secondary amine, or —OM, M being a cation and $R_{10}$ stands for H or the residue of a primary amine which is diminished by an $NH_2—$ group.

34. A composition according to claim 18, wherein said electron donor is at least one compound represented by formula II

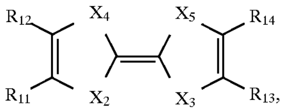

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or especially H, or $R_{11}$ and $R_{12}$ together are a residue

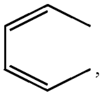

$—(CH_2)_p—$, $—C(CH_3)_2—(CH_2)_p—C(CH_3)_2—$ or $—S—(CH_2)_p—S—$, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

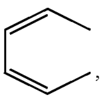

$—(CH_2)_p—$, $—C(CH_3)_2—(CH_2)_p—C(CH_3)_2—$ or $—S—(CH_2)_p—S—$, p is an integer 1–12, and $X_2$, $X_3$, $X_4$ and $X_5$ are Se or S.

35. A composition according to claim 18, wherein said electron donor is at least one compound of formula III

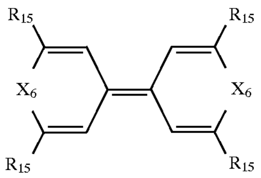

(III)

wherein $X_6$ is S, Se or $N—C_1$–$C_{12}$-alkyl and $R_{15}$ is H, $C_1$–$C_{12}$-alkyl or substituted or unsubstituted phenyl.

36. A composition according to claim 18, wherein said CT complex is represented by general formula XIII $$(D)(A)_n \qquad (XIII),$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

37. A composition according to claim 19, wherein said electron donor is at least one compound of formula I or Ia or a mixture thereof

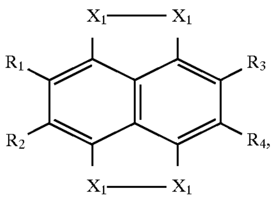

(I)

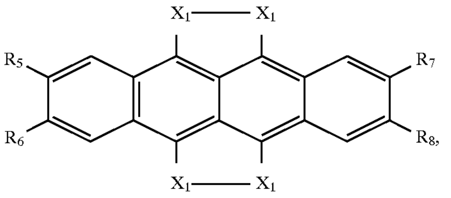

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

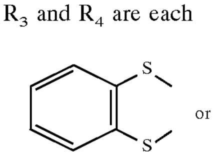

or

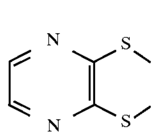

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by an $NH_2$— group.

38. A composition according to claim 19, wherein said electron donor is at least one compound represented by formula II

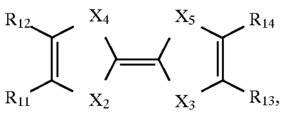

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ together are a residue of

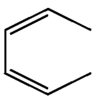

,

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

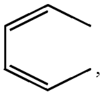

,

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ are Se or S.

39. A composition according to claim 19, wherein said electron donor is at least one compound of formula III

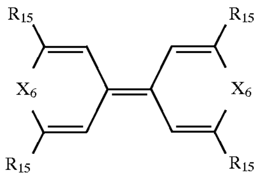

(III)

wherein $X_6$ is S, Se or N—$C_1$–$C_{12}$-alkyl and $R_{15}$ is H, $C_1$–$C_{12}$-alkyl or substituted or unsubstituted phenyl.

40. A composition according to claim 19, wherein said CT complex is represented by general formula XIII $$(D)(A)_n \qquad (XIII),$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

41. A composition according to claim 20, wherein said electron donor is at least one compound of formula I or Ia or a mixture thereof

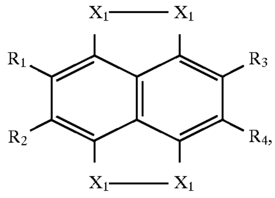

(I)

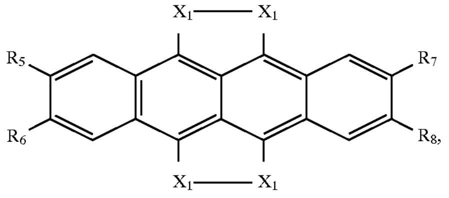

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

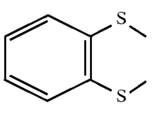

or

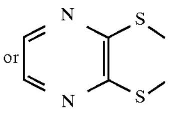

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by an $NH_2$— group.

42. A composition according to claim 20, wherein said electron donor is at least one compound represented by formula III

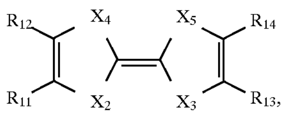

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or especially H, or $R_{11}$ and $R_{12}$ together are a residue of

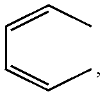

,

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or especially H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

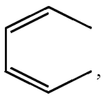

,

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ are Se or S.

43. A composition according to claim 20, wherein said electron donor is at least one compound of formula III

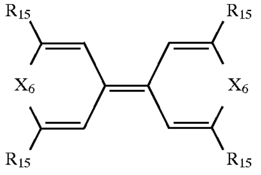

(III)

wherein $X_6$ is S, Se or N—$C_1$–$C_{12}$-alkyl and $R_{15}$ is H, $C_1$–$C_{12}$-alkyl or substituted or unsubstituted phenyl.

44. A composition according to claim 20, wherein said CT complex is represented by general formula XIII $$(D)(A)_n \qquad \text{(XIII)},$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

45. A composition according to claim 21, wherein said electron donor is at least one compound of formula I or Ia or a mixture thereof

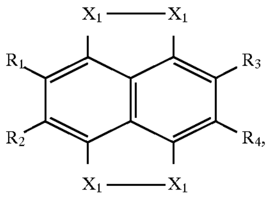

(I)

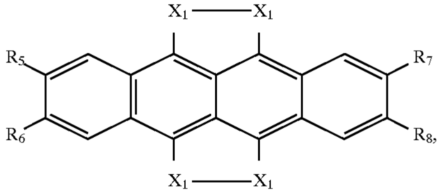

(Ia)

wherein $X_1$ is S, Se or Te, $R_1$, $R_2$, $R_3$ and $R_4$ are each independently of one another H or Cl, or $R_1$ and $R_2$ as well as $R_3$ and $R_4$ are each

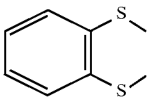

or

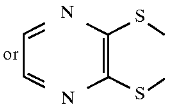

or $R_1$, $R_2$, $R_3$ and $R_4$ are each independently of one another phenylthio, 4-methyl- or 4-methoxyphenylthio or 4-pyridylthio, $R_5$, $R_6$, $R_7$ and $R_8$ are each independently of the other H or F, $R_5$ is $CH_3$ and $R_6$, $R_7$ and $R_8$ are H or $R_5$, $R_6$, $R_7$ and $R_8$ are $CH_3$, $R_5$ and $R_6$ are $CH_3$ or Cl and $R_7$ and $R_8$ are H or $R_5$ and $R_6$ are H, $R_7$ is —$COR_9$ and $R_8$ is H or —$COR_9$, or $R_5$ and $R_6$ are H and $R_7$ and $R_8$ together are —CO—O—CO or —CO—$NR_{10}$—CO—, $R_9$ is halogen, —OH, —$NH_2$, or the residue of an alcohol or of primary or secondary amine, or —OM, M being a cation and $R_{10}$ stands for H or the residue of a primary amine which is diminished by an $NH_2$— group.

46. A composition according to claim 21, wherein said electron donor is at least one compound represented by formula II

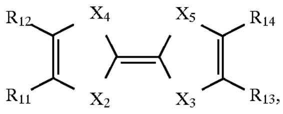

(II)

wherein $R_{11}$, $R_{12}$, $R_{13}$ and $R_{14}$ are each independently of one another $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ together are a residue of

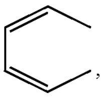

,

—$(CH_2)_p$—, —$C(CH_3)_2$—$(CH_2)_p$—$C(CH_3)_2$— or —S—$(CH_2)_p$—S—, p is an integer 1–12 and $R_{13}$ and $R_{14}$ are each independently of the other $C_1$–$C_{12}$-alkyl, phenyl, $C_1$–$C_{12}$-alkylphenyl, $C_1$–$C_{12}$-alkoxyphenyl or H, or $R_{11}$ and $R_{12}$ are each independently of the other $C_1$–$C_{12}$-alkyl, phenyl, $C_1$–$C_{12}$-alkylphenyl, $C_1$–$C_{12}$-alkoxyphenyl or H or $R_{13}$ and $R_{14}$ together are a residue of

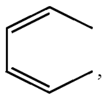

—$(CH_2)_p$—, —$C(CH_3)_2$—$(CH_2)_p$—$C(CH_3)_2$— or —S—$(CH_2)_p$—S—, p is an integer 1–12, and $X_2$, $X_3$, $X_4$ and $X_5$ are Se or S.

47. A composition according to claim 21, wherein said electron donor is at least one compound of formula III

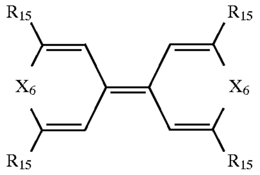

(III)

wherein $X_6$ is S, Se or N—$C_1$–$C_{12}$-alkyl and $R_{15}$ is H, $C_1$–$C_{12}$-alkyl or substituted or unsubstituted phenyl.

48. A composition according to claim 21, wherein said CT complex is represented by general formula XIII $$(D)(A)_n \qquad (XIII),$$

wherein D is an electron donor, A is an electron acceptor and n is a number 0.1–2.0, and the electron donor is weakly polymer-soluble if the electron acceptor is polymer-soluble while the electron donor is polymer-soluble if the electron acceptor is weakly polymer-soluble.

* * * * *